April 21, 1959 A. H. LLOYD 2,882,803
BOX SETTING UP MACHINE
Filed Aug. 20, 1953 10 Sheets-Sheet 1

INVENTOR.
ALLEN H. LLOYD
BY
Joseph A. Rave
Attorney

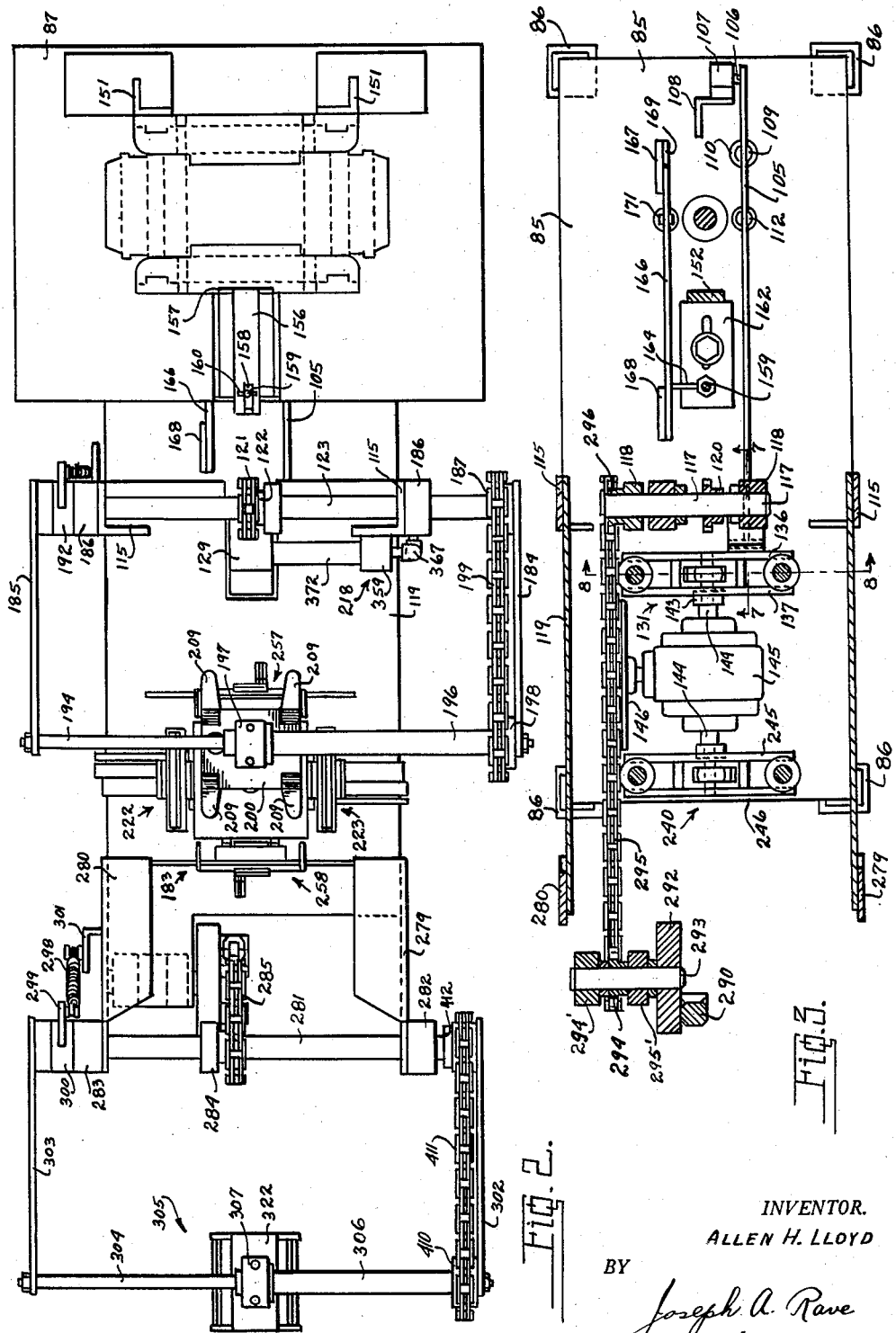

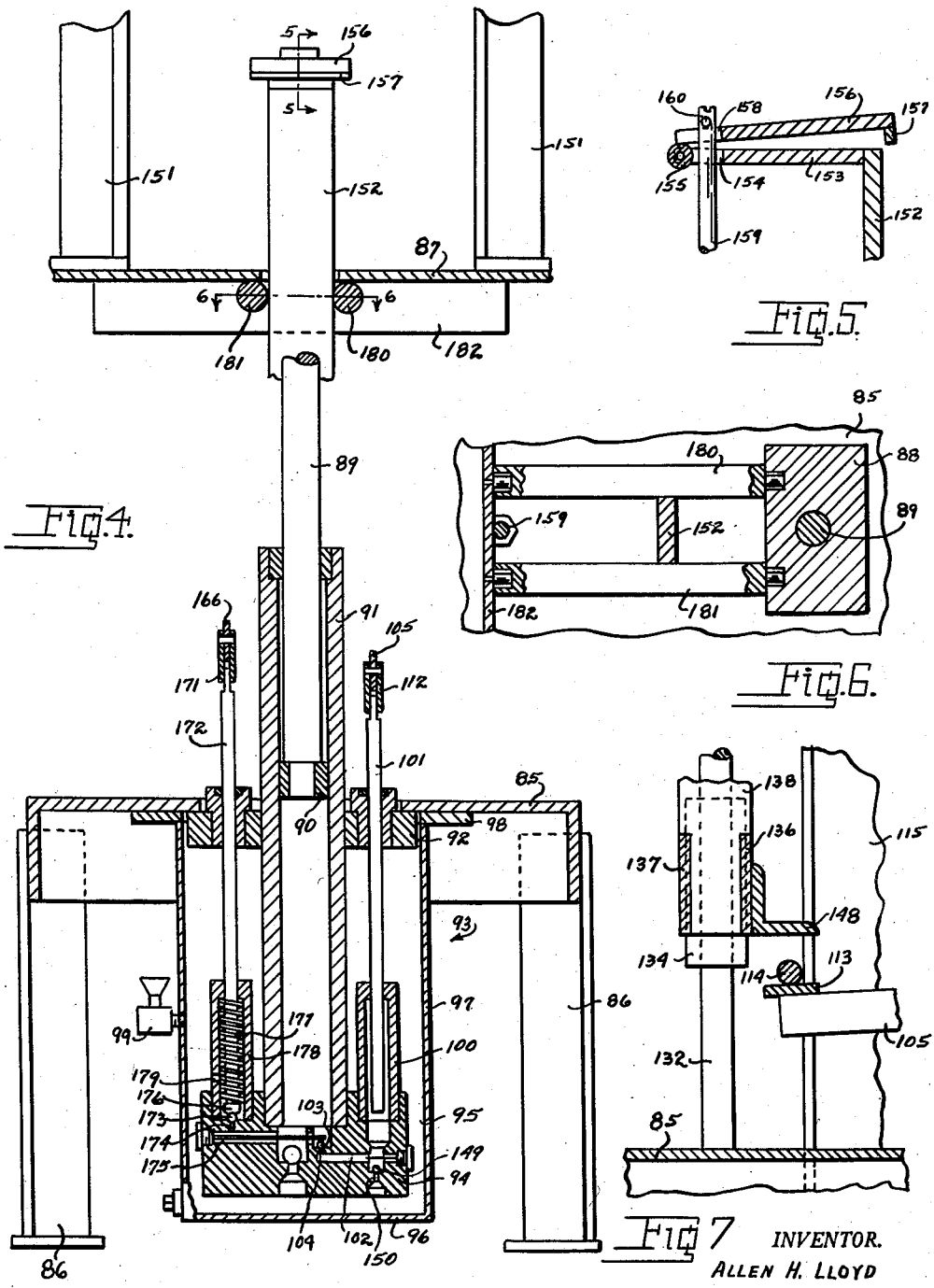

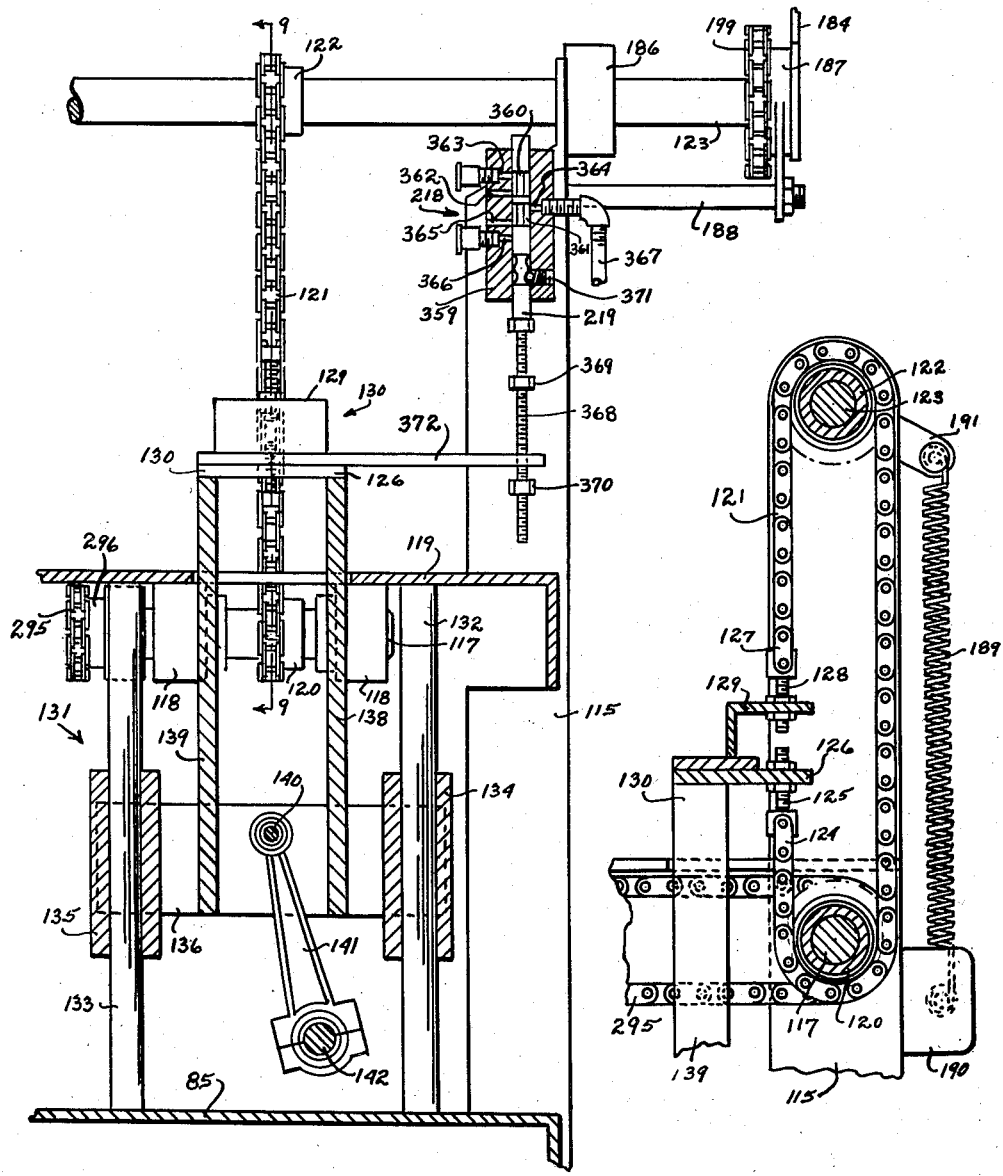

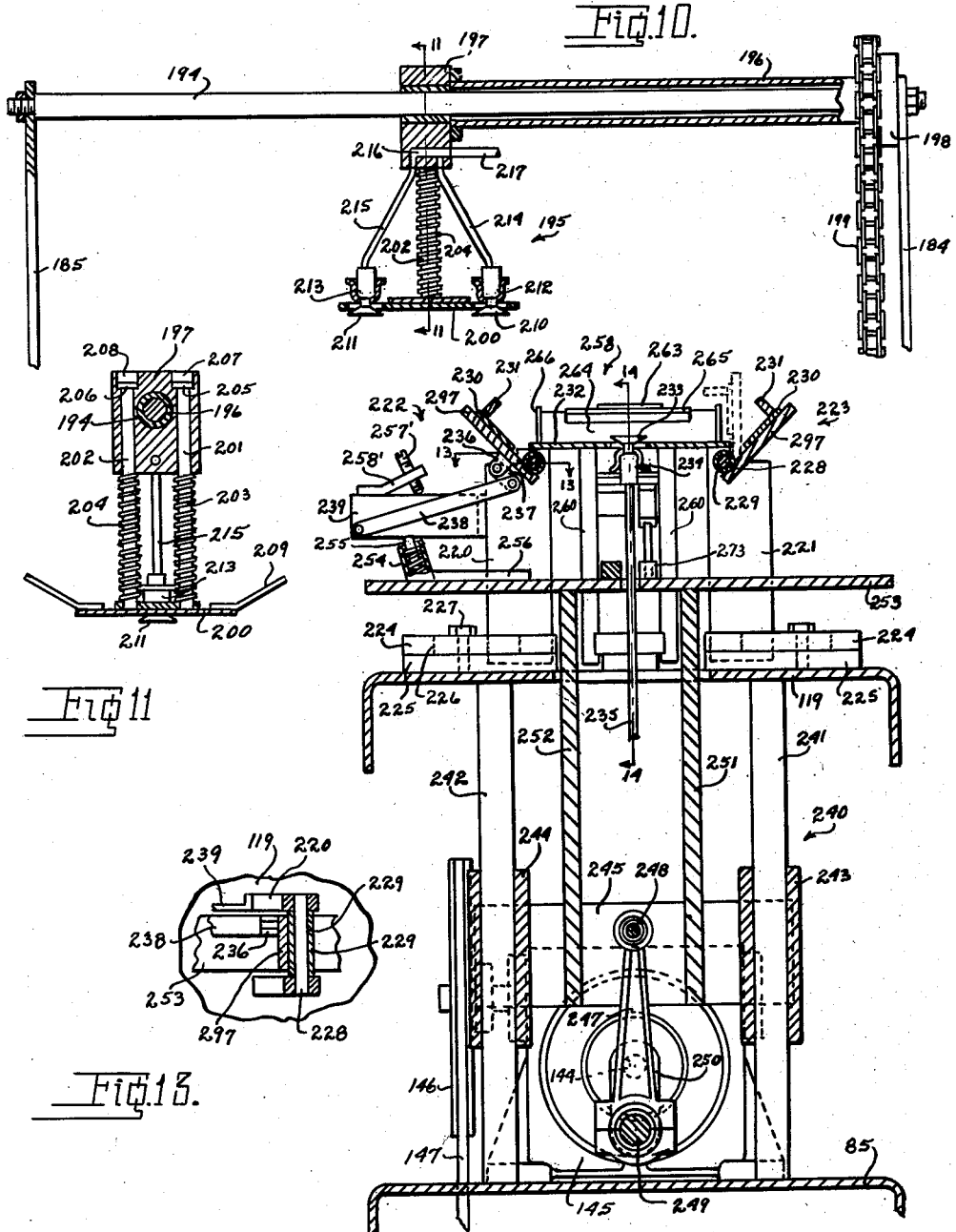

April 21, 1959
A. H. LLOYD
2,882,803
BOX SETTING UP MACHINE
Filed Aug. 20, 1953
10 Sheets-Sheet 6
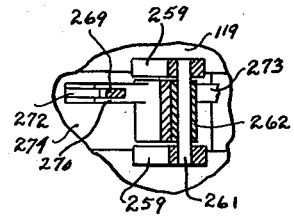
Fig.15.
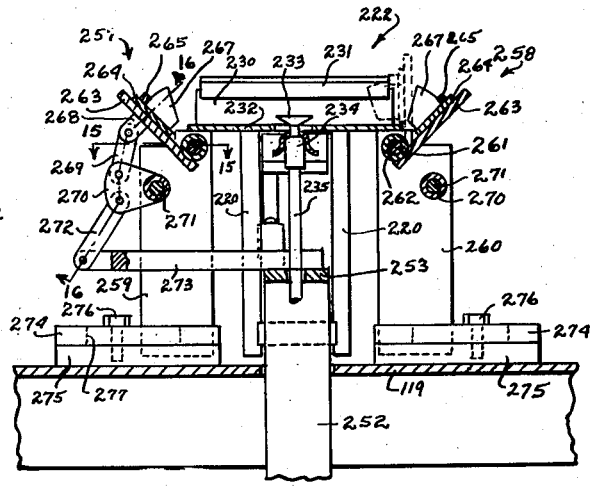
Fig.14.
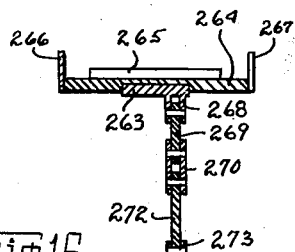
Fig.16.
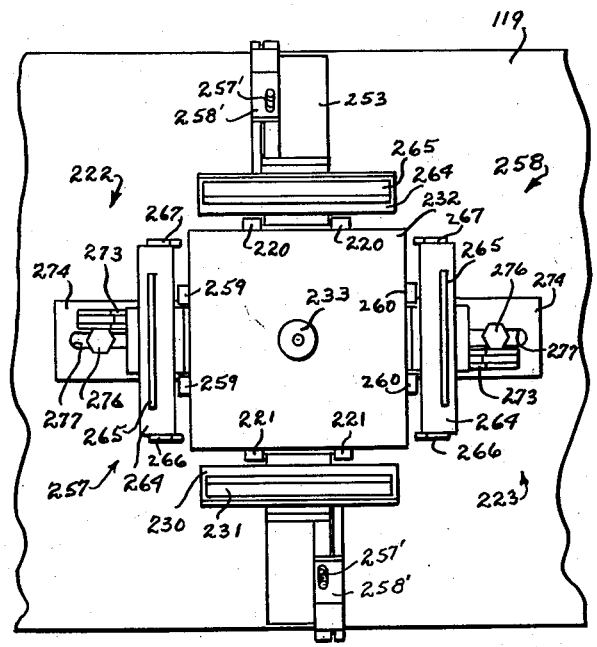
Fig.33.
Fig.17.
INVENTOR,
ALLEN H LLOYD
BY
Joseph A Rave
Attorney INVENTOR.
ALLEN H. LLOYD
BY Joseph A. Rave
Attorney

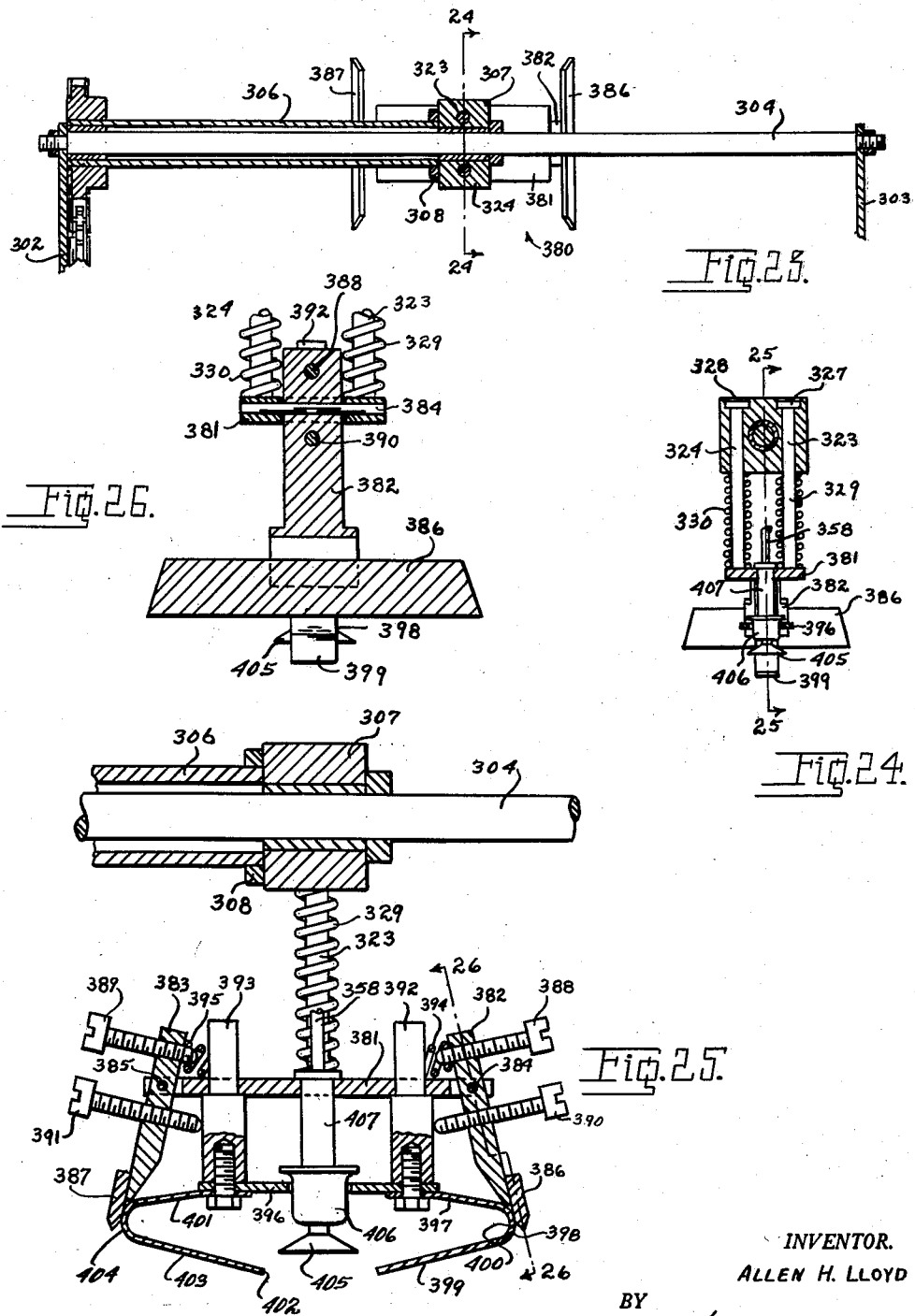

April 21, 1959 — A. H. LLOYD — 2,882,803
BOX SETTING UP MACHINE
Filed Aug. 20, 1953 — 10 Sheets-Sheet 9

INVENTOR.
ALLEN H. LLOYD
BY Joseph A. Rave
Attorney

April 21, 1959 — A. H. LLOYD — 2,882,803
BOX SETTING UP MACHINE
Filed Aug. 20, 1953 — 10 Sheets-Sheet 10

INVENTOR.
ALLEN H. LLOYD
BY
Joseph A. Rave
Attorney

United States Patent Office 2,882,803
Patented Apr. 21, 1959

2,882,803

BOX SETTING UP MACHINE

Allen H. Lloyd, Terrace Park, Ohio, assignor to Tech-Art Inc., Milford, Ohio, a corporation of Ohio Application August 20, 1953, Serial No. 375,504

17 Claims. (Cl. 93—49)

This invention relates to a box setting up machine, that is, a machine for setting up knock-down blanks into a box or carton for subsequent filling.

The machine of the present invention is an improvement on the box setting-up machine disclosed in applicant's pending application Serial No. 362,350 filed June 17, 1953.

The machine of the present invention is for setting up blanks that have been cut to a predetermined configuration and are suitably scored to indicate where the various folds are to occur, that is, the side walls, end walls, tucking flaps, and the like. Basically, the blank is scored along the edges of the bottom panel and which scores integrally connect extensions which are in turn scored to form the side and end walls, whether of single thickness, double thickness, or spaced apart wall members. In addition, the extensions may be provided with tabs at the ends of said walls, or wall members, which are to be arranged with respect to the remaining walls for cooperation therewith in holding the walls in erected positions.

The machine of the present invention is adapted for transferring a knock-down blank from a stack or pile to forming a mechanism which sets up the knock-down blank and cooperates with additional means for completing the erecting of the knock-down blank and transferring same from the machine to a container, discharge conveyor, or the like. The setting up of the knock-down blank to a fully erected carton is automatically from the picking up a blank from the stack to the discharging thereof from the machine.

It is, therefore, the principal object of the present invention to provide a machine for automatically setting up the walls and tucking flaps of a box from a blank and discharging same in its fully erected position from the machine.

Another object of the present invention is the provision of a machine for setting up a box blank in which the walls are provided with a depending inner wall member and wherein the machine automatically inwardly folds said wall members.

Another object of this invention is the provision of a machine that automatically and in timed relation sets up the side and end walls of a four-sided box into operative positions and with tucking flaps of certain walls automatically arranged with respect to the side and end walls of the carton.

A further and specific object of this invention is the provision of a box setting up machine in which the box blanks are automatically fed to the forming mechanism, the box blank automatically set up, and the setup box automatically removed from the forming mechanism and discharged from the machine.

Other objects and advantages of the present invention should be readily apparent by reference to the following specification considered in conjunction with the accompanying drawings forming a part thereof and it is to be understood that any modifications may be made in the exact structural details there shown and described, within the scope of the appended claims, without departing from or exceeding the spirit of the invention.

Fig. 2 is a top plan view of the machine illustrated in Fig. 1.

Fig. 3 is a horizontal sectional view through the machine of Fig. 1 as seen from line 3—3 on said Fig. 1.

Fig. 4 is an enlarged fragmentary vertical sectional view through a portion of the machine as seen from line 4—4 on Fig. 1.

Fig. 5 is a fragmentary sectional view taken on line 5—5 on Fig. 4.

Fig. 6 is a horizontal fragmentary sectional view taken on line 6—6 on Fig. 4.

Fig. 7 is an enlarged fragmentary sectional view taken on line 7—7 on Fig. 3.

Fig. 8 is an enlarged fragmentary sectional view as seen from line 8—8 on Fig. 3.

Fig. 9 is a fragmentary sectional view taken at right angles to Fig. 8 as seen from line 9—9 on said Fig. 8.

Fig. 10 is an enlarged fragmentary sectional view through the transfer head as seen from line 10—10 on Fig. 1.

Fig. 11 is a sectional view taken at right angles to Fig. 10 on line 11—11 on said Fig. 10.

Fig. 12 is an enlarged fragmentary sectional view through the box sides setting up mechanism as seen from line 12—12 on Fig. 1.

Fig. 13 is a fragmentary sectional view taken on line 13—13 on Fig. 12, disclosing details in the construction.

Fig. 14 is a fragmentary sectional view taken at right angles to Fig. 12 as seen from line 14—14 on said Fig. 12.

Fig. 15 is a fragmentary sectional view, similar to Fig. 13, taken on line 15—15 on Fig. 14, and disclosing details in the construction.

Fig. 16 is a vertical sectional view taken on line 16—16 on Fig. 14 and showing details in the construction.

Fig. 17 is a top plan view of the box sides setup mechanism as disclosed in Figs. 12 and 14.

Fig. 23 is a view similar to Fig. 18 illustrating a modification in the discharge head and final setup mechanism.

Fig. 24 is a cross sectional view taken at right angles to Fig. 23 as seen from line 24—24 on said Fig. 23.

Fig. 25 is an enlarged fragmentary vertical sectional view taken at right angles to Fig. 24 as seen from line 25—25 on said Fig. 24.

Fig. 26 is a vertical sectional view taken through a plane to the right of Fig. 24 as seen from line 26—26 on said Fig. 25.

Fig. 33 is an enlarged fragmentary sectional view taken on line 33—33 on Fig. 1.

Throughout the several views of the drawings similar reference characters are employed to denote these same or similar parts.

Figure 1:
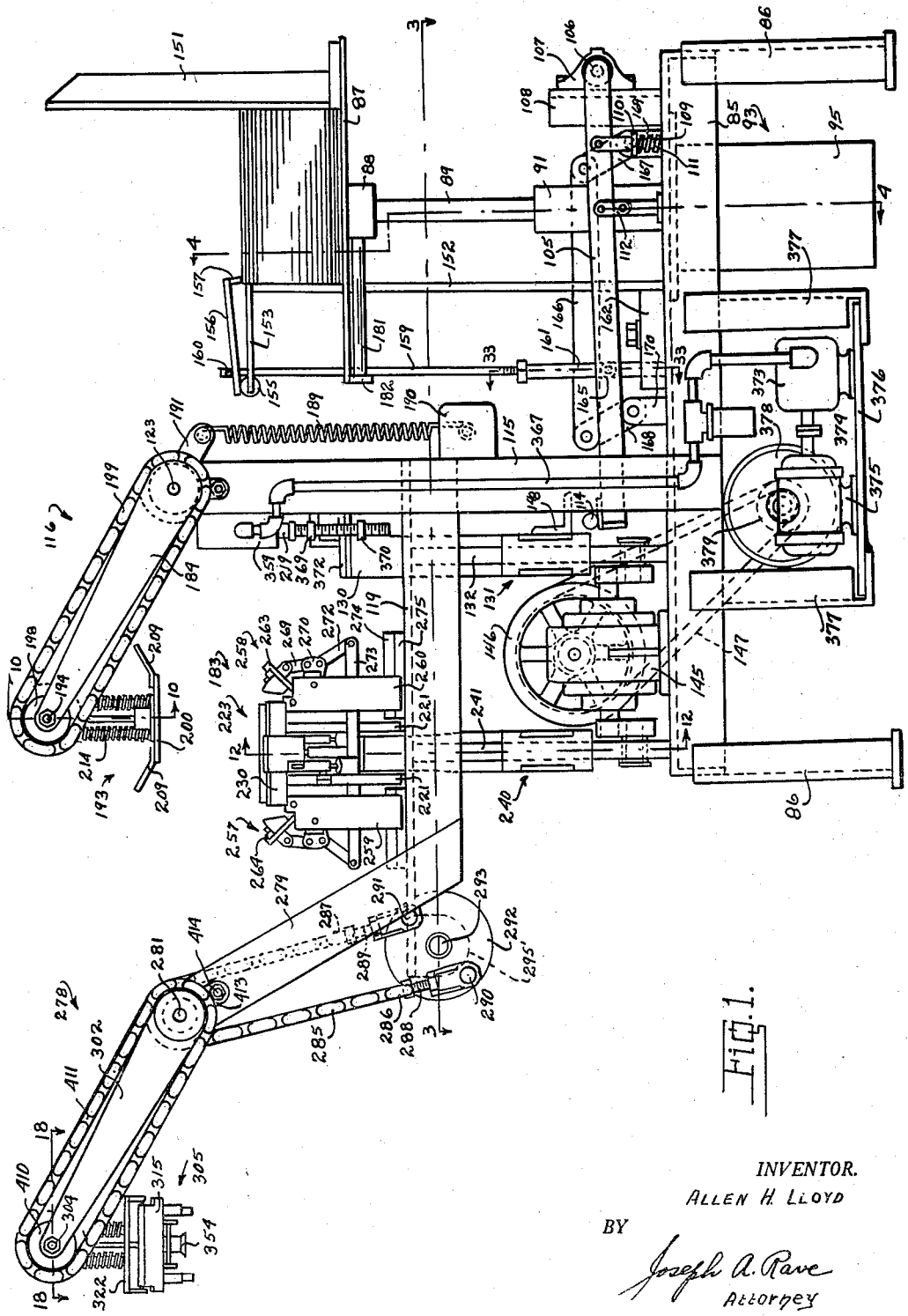
Fig. 1 is a side elevational view of the box setting up machine of the present invention.
Figure 18:
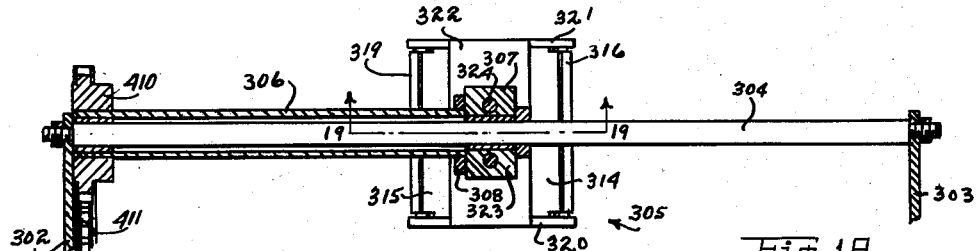
Fig. 18 is an enlarged fragmentary horizontal sectional view through the operating shaft for the box discharge mechanism as seen from line 18—18 on Fig. 1.
Figure 19:
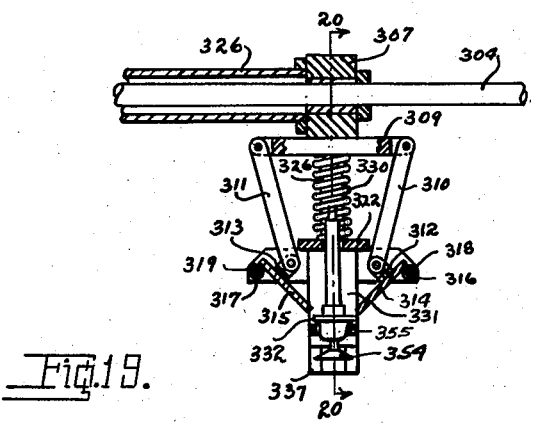
Fig. 19 is a vertical sectional view through the discharge head as seen from line 19—19 on Fig. 18.
Figure 20:
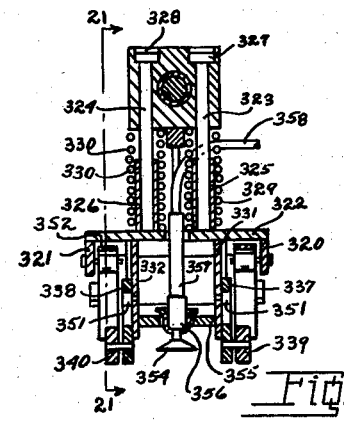
Fig. 20 is a vertical sectional view taken at right angles to Fig. 19 as seen from line 20—20 on said Fig. 19.

Before specifically describing the box or carton setting up machine it is deemed advisable to describe the type of box or carton which may be set up by the machine of the present invention, there is illustrated in the drawings two types of boxes, one of which has its side and end walls of double thickness while the other has its side and end walls of spaced apart inner and outer wall members. It is to be understood that while these specific boxes or cartons are illustrated in the drawings and are to be now described in relative detail that this is merely by way of example of types of boxes or cartons that may be set up and are not to be regarded as the only boxes erectable on the present machine.

Figure 27:
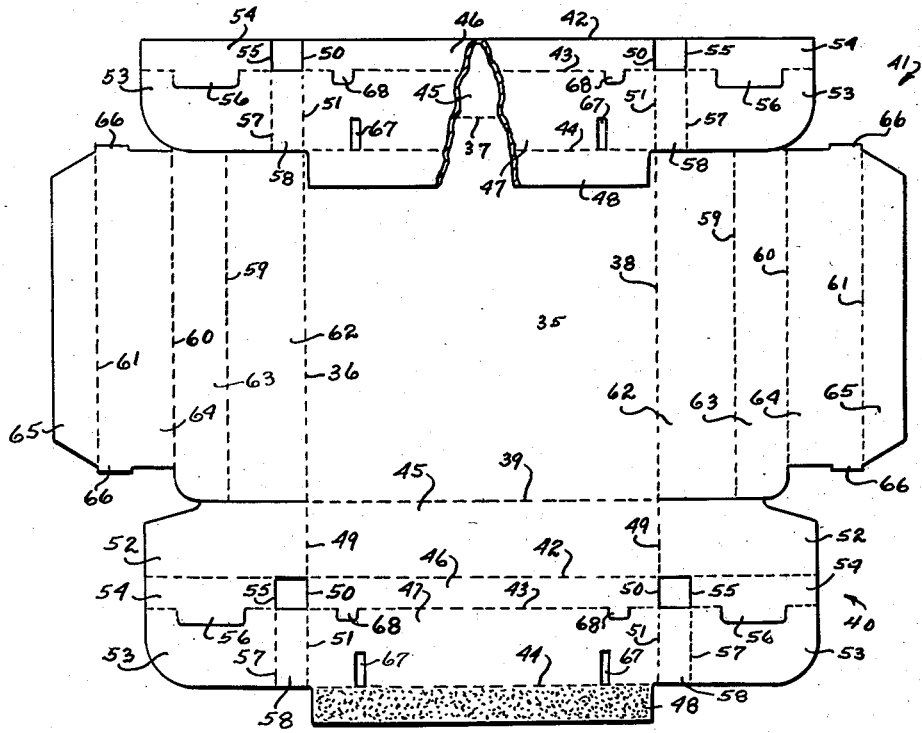
Fig. 27 is a plan view of a box blank partly in its final knock-down position and partly in extended form and illustrating one form of a box to be set up or erected by the machine of the present invention.
Figures 28, 29:
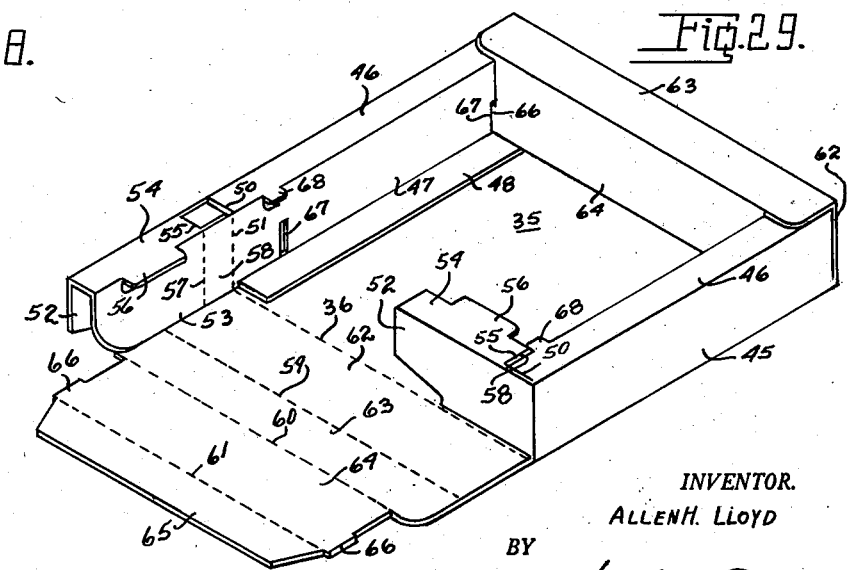
Fig. 28 is a transverse sectional view through a fully knock-down blank and in the form in which it is supplied to the machine for setting up purposes.
Fig. 29 is a perspective view of a box or carton partially erected from the knock-down blank of Figs. 27 and 28 and illustrating the carton as erected by the machine of the present invention.

Specifically, and referring to Figs. 27, 28 and 29 the box there illustrated is formed of a single blank and comprises a bottom panel 35 having its edges defined by score or fold lines 36, 37, 38 and 39. For purposes of description the score or fold line 37 and 39 may be regarded as the carton sides and each score or fold line integrally hingedly connects with the bottom panel a similar extension 40 which forms the carton side walls, as presently will be made clear. The remaining score or fold lines 36 and 38 may be regarded as the ends of the carton and respectively integrally hingedly connected with the carton bottom 35 an extension 41, which in the erected carton forms the end walls thereof.

The side wall extensions are substantially identical, wherefore it is deemed sufficient if but one of them be described in detail. Accordingly, the extension 40 is provided between its hinge or fold line with the bottom panel and its outer end with parallel score or fold lines 42, 43 and 44 for providing in the extension, panels 45, 46, 47 and 48. The panel 45 has its ends defined by score or fold lines 49 and the panel in the erected carton forms the side wall outer wall member. The panel 46 has its ends defined by cut lines in alignment with the score or fold lines 49 and said panel 46 forms in the erected carton the side wall top wall member. The panel 47 has its ends defined by score or fold lines 51 which are in alignment with the cut lines 50 and the said panel 47 in the erected carton forms the side wall inner wall member. The panel 48 is of a length substantially equal to the length of the side wall inner wall member or panel 47 and in the erected carton constitutes a glue flap for hingedly securing the lower edge of the inner wall member or panel 47 to the bottom panel 35.

The side wall members, respectively, through their end scores 49 and 51 have integrally hingedly connected therewith tucking flaps 52 and 53. The tucking flaps 52 and 53 at each end of each side wall has intermediate them a tucking flap panel 54, normally of a width substantially equal to the width of the top wall or panel 46, with its inner end 55 spaced from the cut end 50 of the side wall top wall member or panel 46. The tucking flap panel 54 is provided with a projecting tongue or lug 56 that is cut from the tucking flap 53 thereby supplying the said panel 54 with a width essentially greater than the side wall top wall member or panel 46. The tucking flap 53 has its inner end defined by a score or fold line 57 thereby providing a hinge panel 58 between the said tucking flap 53 and end of the side wall inner wall member 51.

The end walls extensions being substantially identical it is deemed sufficient if but one of them be described in detail, and accordingly, said extension is provided between its score or fold line with the bottom panel and the outer end thereof with parallel score or fold lines 59, 60 and 61 thereby forming in said extension panels 62, 63, 64 and 65. The panels 62 and 63 each have a length substantially equal to the width of the bottom panel 35 and in the erected carton form the end wall outer wall member and end wall top wall member. The panel 64 has a length shorter than panels 62 and 63 since it is to be disposed between the side walls inner wall members when erected. The panel 64 has outwardly projecting from its outer corners, locking lugs 66 which cooperate with slits or slots 67 formed in the side walls inner wall members or panels 47. The remaining end wall extension panel 65 constitutes a spacer flap for spacing the lower end of the end wall inner wall member from the outer wall member 62, a distance substantially equal to the width of the end wall top wall member or panel 63.

It will be noted that the side walls top wall members or panels 46 are of less width than the end wall top wall members or panels 63 wherefore the erected carton has end walls of greater width than side walls as clearly illustrated in Fig. 29. It is for this reason that the tucking flaps top panels 54 are provided with the projected lug 56 which establishes the width of the end walls. Cooperating with said end walls spacer lugs 56 the side walls top wall members are each provided with a lug 68 which is cut from the inner wall member to project, upon erection of the box or carton, into the carton with their edges in alignment with the said spacer lug 56 for spacing the ends of the end walls inner wall members from the outer wall members and to provide a means on which the setting up machine may fold the end wall inner wall members in positioning the same.

After the blank has been cut and scored in accordance with the lower side wall extension and end wall flaps as illustrated in Fig. 27, adhesive is applied to the glue flap 48 and the extensions 40 respectively folded on the score or fold line 42 to bring said extensions to the position illustrated for the upper extension in said Fig. 27. The side wall extensions 40 are now each in the position illustrated in Fig. 28. It is in this position that the knock-down blanks are supplied to the setting up machine, as illustrated for example in Fig. 2.

Figure 30:
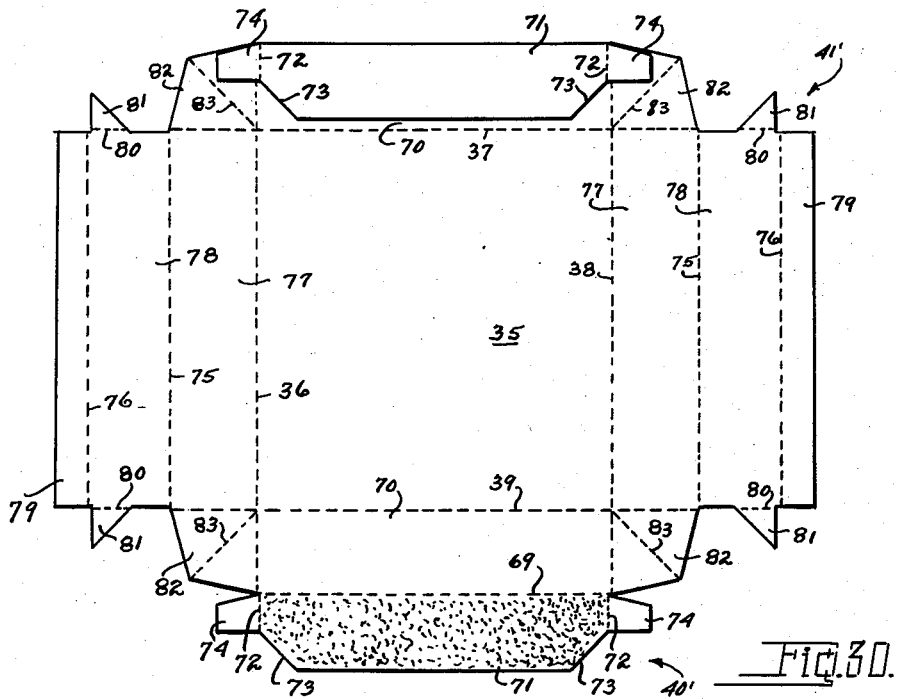
Fig. 30 is a view similar to Fig. 27 of a modified blank of a second form of box erectable on the machine of the present invention particularly with the final erecting head as illustrated in Figs. 23 through 26.
Figures 31, 32:
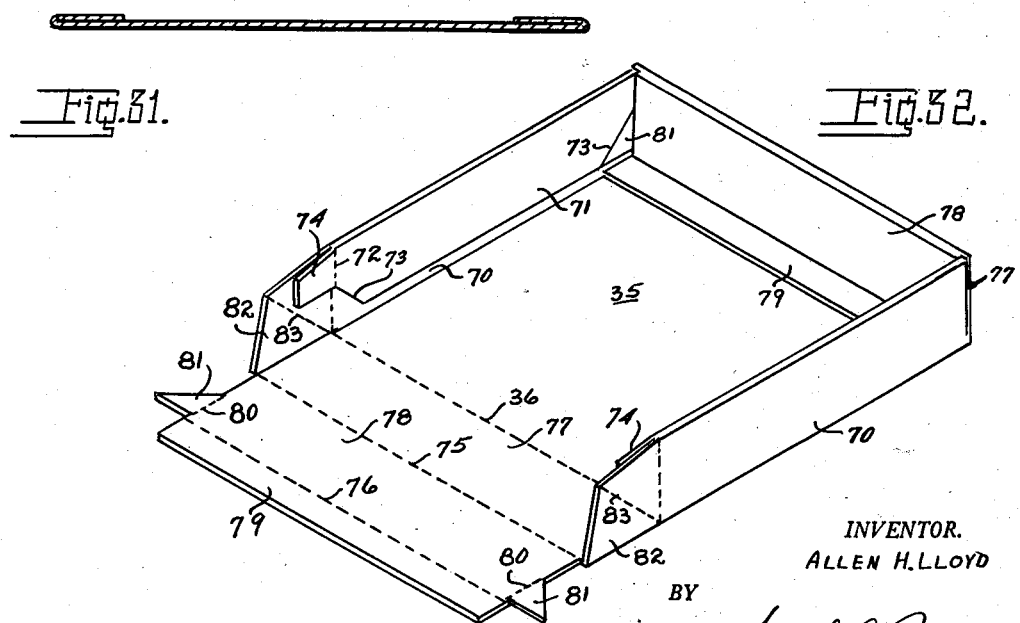
Fig. 31 is a transverse sectional view through the blank of Fig. 30 in its fully knock-down position and illustrating the condition of said blank when supplied to the machine for erection.
Fig. 32 is a perspective view of a partially erected box from the knock-down blank of Figs. 30 and 31.

The box and blank illustrated in Figs. 30, 31 and 32, as noted above, differs from that just described principally in that its side and end walls are of double thickness and not of spaced apart inner and outer wall members. In addition, the said box or carton is provided with a slightly different locking means for holding the erected side and end walls in operative positions.

Briefly and specifically, the box in Figs. 30, 31 and 32 comprises a bottom panel 35 bounded by score or fold lines 36, 37, 38 and 39 respectively, constituting the sides and ends of said bottom panel and integrally hingedly connecting therewith side wall extensions 40' and 41'.

The extensions 40' are each provided with a longitudinal score or fold line 69 thereby providing side walls outer wall members or panels 70 and inner wall members or panels 71. The inner wall members or panels 71 each has its ends, in part, defined by a score or fold line 72 and by an angular or bias cut line 73. Each score or fold line 72 integrally hingedly connects with the panel 71 a tucking flap 74 while each angular or bias cut line 73 constitutes a portion of the wall locking mechanism as will be presently made clear.

The end wall extensions 41' are each provided with a pair of parallel score or fold lines 75 and 76 thereby providing end walls each having an outer wall member or panel 77 and an inner wall member or panel 78 together with a terminal panel or creeper flap 79. Each of the end walls inner wall members or panels 78 has a portion of each of its ends defined by a score or fold line 80 for integrally hingedly connecting therewith a locking lug 81. As will be seen, the locking lugs are each triangular shaped for cooperation with the angular or bias cut 73 in locking the box in its erected condition.

The end walls outer wall members and the side walls outer wall members each has its ends defined by a score or fold line through which they are connected through a corner piece 82 which is provided with a diagonal score or fold line 83. The corner pieces 82 are each adapted to be folded on the diagonal score or fold line 83 in a bellowswise fashion and are therefore known in the trade as "bellows corners."

After the blank has been cut and scored as just described, adhesive is applied to the exposed surface, as seen in Fig. 30, of the side wall inner wall member or panel 71 whereupon the said panel is folded on the score or fold line 69 into engagement with the panel or side wall inner wall member 70. The knock-down blank is now in the condition as illustrated in Fig. 31 and it is in this condition that it is supplied to the setting up machine for erection.

As will be obvious from Fig. 32, the setting up of the box side walls results in a triangular cut-away portion at the lower corners of the inner wall members and that the setting up of the end walls disposes the triangular locking lugs 81 into said triangular cut-away portions, thereby locking the parts in their erected positions. It should be noted that the insertion of the triangular locking lugs 81 is in reality a snap action since the said locking lugs tend to assume their normal outward positions.

The mechanism for setting up the box blank, that is, positioning the side walls, end walls, and tucking flaps with respect to the bottom panel, comprises a bed 85 from the four corners of which depend legs 86 for upwardly spacing the bed from the supporting floor. The bed 85 may take any suitable or desirable form, that shown in the drawings being formed from a rectangular sheet of metal with the four sides thereof downwardly bent to form flanges each having its end edge secured to the end edge of the adjacent flange.

Upwardly of the bed 85 and at its right hand end, as seen in Fig. 1, is the box blank supporting and feeding mechanism and comprises a vertically movable platform 87 having secured to its under surface at substantially its midpoint a depending block 88. The depending block 88 has secured therein to downwardly project therefrom a piston rod 89 which at its lower end carries a piston 90, see Fig. 4.

The piston 90 is disposed within a sleeve or cylinder 91 which is secured to and carried by a closure plate 92 of a pump mechanism, indicated in general by the reference numeral 93. The piston rod 89 extends upwardly of the cylinder 91 through a suitable packing carried by the upper end of said cylinder 91.

The lower end of the sleeve or cylinder 91 has secured thereto a valve housing 94 through which is formed valve controlled passageways as will presently be made clear. The said valve housing 94 and lower end of the sleeve or cylinder 91 is disposed within a sump or pump enclosing housing 95, in the form of a container having a bottom 96 from the periphery of which upstands the housing wall 97 with its upper end secured to the pump mechanism closure plate 92 and with said housing having a radially extending flange 98 through which it is secured to the under surface of the bed 85 to depend therefrom. The housing 95 is provided through its wall 97 with a filler connection 99 whereby oil, or some other non-compressible hydraulic medium, is introduced into the housing 95. A suitable draining plug may be provided for draining the said housing.

Upstanding from said valve housing 94 is a pump sleeve or cylinder 100 in which operates a pump plunger 101 having its upper end connected with operating mechanism to be subsequently described. In practice, the housing 95 is provided with the hydraulic medium to a level at about the filling connection 99 and which level is well above the lower end of the pump plunger 91 as is obvious from an inspection of Fig. 4.

In practice, the plunger 101 is downwardly actuated for forcing an amount of hydraulic medium equal to its displacement from the pump cylinder 100 through port 102 to unseat valve 103 and force the medium through a port 104 into the piston cylinder 91 and thereby upwardly force the piston 90 and the parts carried thereby. It should be noted that, and as later will be made clear, the movement of the piston is incremental and is in the nature of the thickness of a box blank so as to maintain the box blank at a constant level above the bed 85. For accuracy in control of the position of the blank, and as later will be made clear, the parts are so adjusted that a slightly additional upward movement of the piston 90 and parts carried thereby is effected and which additional feed is subsequently accounted for.

The pump plunger or pison operating mechanism is effected through a lever 105, see Figs. 1 and 3, which has its one end secured to a pivot pin 106 oscillatable in a bearing 107 secured to and carried by a short upstanding post 108 from the bed 85. Connected with the lever 105 at a point intermediate its ends is a guide pin 109 having a radial collar 110 forming one abutment for a spring 111 which surrounds the guide pin and which spring abuts on its other end with the bed plate 85. The guide pin 106 extends through and is guided by an aperture in the bed plate 85. This mechanism is for maintaining the lever 105 in a normal position which, in turn, maintains the pump plunger 101 in its desired operative position. The lever 105 is connected by links 112 at a point intermediate its ends with the pump plunger or piston 101, as clearly illustrated in Figs. 3 and 4. The other end of the lever 105, see Figs. 1, 3, and 7, is provided with a relatively short transverse treadle member 113 to which is welded or otherwise secured a cylindrical member or pin 114. The member 114 is in the form of a cylindrical member or pin so as to provide a line contact with the operating mechanism, as will presently be made clear.

The bed 85 to the left of the blank elevating mechanism, as seen in Fig. 1, carries the box blank forming or setting up mechanism which includes a pair of upstanding posts 115 rising from the edges of the said table 85. The posts 115 extend upwardly above the box setting up mechanism and supports the blank transfer mechanism indicated in general by the reference numeral 116, see Fig. 1. The box transfer mechanism 116 comprises a driving shaft 117, illustrated most clearly in Figs. 3 and 8 and journaled in bearings 118 carried by and depending from the forming or setting up mechanism shelf or bracket 119. The shaft 117 is held against axial movement relative to the bearings 118 by any suitable or desirable means and has keyed or otherwise secured thereto at a point, preferably intermediate the bearings 118, a sprocket 120. The sprocket 120, see Fig. 9, has extending therearound a sprocket chain 121 which in turn extends around a sprocket 122 keyed or otherwise secured to an oscillatable shaft 123 which forms the actuating shaft of the transfer mechanism and is clearly illustrated in Fig. 1. The sprocket chain 121, after passing around sprocket 120, has its one end 124 connected, through a stud 125 to a finger 126 and said sprocket chain 121, after passing around sprocket 122, has its other end 127 connected, through a stud 128, to a finger 129. The fingers 126 and 129 are secured to and laterally project from a reciprocating frame 130. The reciprocating frame 130 and its fingers 126 and 129 through the sprocket chain 121 and sprockets 120 and 122 form, in effect, a reciprocating flexible rack for actuating the drive shaft and oscillating the actuating shaft of the transfer mechanism.

The mechanism for actuating the reciprocating frame 130 may take any suitable or desirable form, that shown in the drawings being in the form of, what may be termed, a cross-head since it is operated by a crank, and which cross-head is indicated in its entirety by the reference numeral 131. The cross-head comprises a pair of guide posts 132 and 133 upstanding from the bed 85 and on each of which posts is mounted a sleeve 134 and 135. The sleeves are connected with one another by means of a front strap plate 136 and a rear strap plate 137. The sleeves 134 and 135 together with the strap plates 136 and 137 constitute the reciprocating cross-head 131 being guided by the posts 132 and 133. It is in this cross-head that the reciprocating frame 130 is connected through the agency of the frame uprights or longitudinal members 138 and 139.

The cross-head 131 substantially midway of its length is provided with a pin 140 on which is journaled the upper end of a connecting rod 141. The lower end of the connecting rod 141 is journaled to a crank pin 142 outwardly projecting from a crank arm 143. The crank arm 143 is keyed or otherwise secured to shaft 144 projecting from one side of a speed reducer 145. The speed reducer 145 may, and in effect does, constitute a crank shaft for operating the cross-head. The speed reducer 145, crank shaft, has connected therewith a pulley 146 actuated through a belt 147 from a suitable source of motive power, an electric motor, disposed below the table 85, as illustrated in Fig. 1.

The cross-head 131 for the box blank transfer mechanism constitutes the motive power for the platform pump and, as seen in Figs. 1, 3 and 7, has projecting therefrom, preferably from the tie plate 136, a foot member 148 which is conveniently in the form of a section of angle iron, and overlies the pump lever contact member 114.

The operation of the pump plunger or piston 101 is believed obvious from the foregoing since each time the transfer mechanism cross-head 131 is at its lower end it depresses the far end of the lever 105 against the resistance of spring 111 for downwardly forcing pump piston 101 and forcing, as noted above, the hydraulic medium into the cylinder 91. Upon the reverse movement of the transfer mechanism cross-head, the spring 111 returns the lever 105 to its normal position and thereby returns the pump piston 101 to its normal position.

The movement of the lever 105 and pump piston 101 by the spring 111 creates a suction within the pump cylinder 90 which draws the outlet check valve 103 to its seat and at the same time unseats a second or inlet check valve 149 and effects, through the port or opening 150, the suction of the hydraulic medium from the housing 95 into the pump cylinder 100. In this manner the pump mechanism is maintained primed for immediate operation upon depression of the pump lever 105.

As will be noted from Figs. 1 and 2, the box blanks are disposed between a pair of upstanding posts 151 and an opposing central upstanding member 152. The member 152 performs a dual purpose, that of providing a guide for the platform 87 in its vertical movement to prevent angular or lateral displacement thereof and for supporting a control valve operating mechanism which controls the upward movement of the blanks for the purpose of maintaining definite the upper surface of the box blank stack. The member 152 has rearwardly projecting therefrom, see Figs. 1 and 5, an arm 153 having its rear end furcated to provide a recess 154 therein, see Fig. 2. Spanning the rear end of the recess is a roller 155 to which is welded or otherwise secured a trigger 156 of a length slightly greater than that of the arm 153 wherefore it projects ahead of the said arm 153 and the guide member 152. Depending from the free end of the trigger 156 is a contact finger 157 that is at all times on the upper surface of the uppermost blank of the stack at the edge of said uppermost blank. The trigger 156 is at its rear end furcated to provide a recess 158 in alignment with the recess 154 in arm 153.

Depending through the aligned recesses 154 and 158 is a valve control rod 159 provided at its upper end with a transverse pin 160 which spans the recess 158 in the trigger 156, as shown in Fig. 2. As will be noted from Figs. 2 and 5, the valve control rod 159 is inwardly of the pivot roller 155, wherefore any movement imparted to the trigger 156, particularly upwardly, will be given to the valve control rod 159.

The valve control rod 159 depends, as seen in Figs. 1 and 33, to have its lower end threaded into a sleeve 161 which is guided in an aperture in a block 162 secured to the upper surface of the bed 85. In normal operation the sleeve 161 rests on bed 85 or on a solid abutment that may be provided by the block 162 and in this manner determines the position of the pin 160 and thereby the normal position of the trigger 156. The connection of the sleeve 161 and rod 159 is a threaded one as illustrated at 163 and is for the purpose of effecting an elongation of the effective length of the rod 159 and sleeve 161 for thereby adjusting the operating position of pin 160.

Outwardly extending from the sleeve 161 at a point upwardly of the bed 85 is a pin 164 carrying at its outer end a roller 165 underlying a link 166. The link 166 is pivotally connected at its opposite ends with arms 167 and 168 in turn pivotally connected with lugs 169 and 170 upstanding from the bed 85. The purpose of this arrangement is that the upward movement of the link 166 will be at all times in parallelism with the bed 85 as is obvious from Fig. 1.

Pivotally connected with the link 166, as by straps 171, intermediate its ends, is a valve stem 172 which, see Fig. 4, depends into the pump housing 95 to carry at its lower end a valve 173 controlling port 174 in the valve housing 94, that communicates with the piston sleeve or cylinder 91 by way of port 175. The valve stem 172 has at its lower end a head 176 to which is attached the valve 173 and the said head 176 forms an abutment for a coil spring 177 that encircles the valve stem 172 for a portion thereof within a valve stem guide sleeve 178 and the upper end of which guide sleeve constitutes a second abutment for the spring 177. The spring 177 maintains the valve 173 against its seat except when raised therefrom by the trigger 156, as will now be set forth.

As was noted above, the displacement of the pump plunger 91 by the operating treadle 148 is such as to exceed, slightly, the thickness of a box blank wherefore the piston 90 is caused to operate upwardly an amount greater than necessary to upwardly elevate the stack for a single box blank thickness. The parts are so adjusted that this excess amount of movement correspondingly raises the trigger 156 thereby raising the valve control rod 159 and through its pin 164 and roller 165 raises the link 166. Upward movement of the link 166 carries with it the valve stem 172 for unseating the valve 173. The unseating of the valve 173, in effect, permits the platform 87 and parts carried thereby to descend thereby forcing the hydraulic medium from the cylinder 91 through ports 175 and 174 past the valve 173 into the guide sleeve 178. Actually the platform is held stationary once the trigger 156 is raised to unseat the valve 173. Guide sleeve 178 is provided with an exhaust port 179 thereby permitting the hydraulic medium to be discharged into the pump housing 95 exteriorly of the valve housing 94. The platform 87 and parts connected therewith in their descent permit the trigger 156 to likewise descend thereby permitting the valve control rod 159 to descend and permitting the spring 177 to reseat the valve 173 and prevent further discharge from the cylinder 91. This maintains the upper surface of the box blank stack at a predetermined constant level.

The guide member 152 is effective in guiding the platform 87 by being flanked by rollers 180 and 181, see Fig. 6. The rollers 180 and 181 each has its forward end mounted in the block 88 and has its rear end mounted in a flange 182 depending from the rear end of the platform 87. It is believed the guiding of the platform is obvious from Figs. 1, 4 and 6.

The transfer mechanism 116 is operable from a position over the platform 87, where it picks up the uppermost box blank to a position over the box folding mechanism, indicated in general in Fig. 1 by the reference numeral 183. The transfer mechanism is provided at each of the outer ends of the actuating shaft 123 with an arm 184 and 185. The shaft 123 is oscillatable in suitable bearings or journals 186 carried by the upstanding posts 115 and it is beyond these bearings that the arms 184 and 185 are secured to the shaft 123. Loosely mounted on one end of the oscillatable shaft 123 is a sprocket 187 with said sprocket being held against rotation by a pin 188, see Figs. 1 and 8, which has its one end connected to the sprocket 187 and its other end anchored to the adjacent post 115, see Fig. 8.

It will be obvious that vertical reciprocation of the frame 130 through the sprocket chain 121 effects rotary or oscillatory movement of the shaft 123. Since the arms 184 and 185, as will presently be made clear, carry the transfer head which has some weight, the oscillation of the actuating shaft 123 is counter-balanced by a spring 189 which has its one end anchored to a lug 190 projecting from one of the posts 115 with said spring having its other end secured to the outer end of a finger 191 projecting from a collar 192 keyed or otherwise secured to the said actuating shaft 123, all as clearly illustrated in Figs. 2 and 9.

Carried by the outer ends of the arms 184 and 185 is the transfer head mechanism indicated in general by the reference numeral 193, and which transfer head mechanism comprises a shaft 194 on which is mounted the transfer head indicated in its entirety by the reference numeral 195. The head 195 is adapted to be oscillated relative to the shaft 194 wherefore the shaft 194 has oscillatably journaled thereon a sleeve 196 extending from one of the arms, arm 184, for example, to the head 195 where the said sleeve 196 is secured to head block 197. The sleeve 196 adjacent the arm 184 has secured thereto a sprocket 198 which is in line with the sprocket 187 on the actuating shaft 123. Extending about said sprockets 187 and 198 is a sprocket chain 199.

It will be understood that since the arms 184 and 185 are secured to the actuating shaft 123 they oscillate with said shaft 123 and since the sprocket 187 is held against movement the sprocket chain 199 will be caused to travel around the said sprocket 187 and thereby rotate or oscillate the sprocket 198. The purpose of this arrangement is to maintain the transfer head 195 in a vertical position as it travels from its position over the stack to its position over the box folding mechanism.

The transfer head 195, in addition to the block 197, has a plate 200 connected with said block by means of pins 201 and 202 which are slidably mounted in the block 197. Encircling each of the pins 201 and 202 is a spring, respectively 203 and 204, each abutting on its lower end with the plate 200 and on its upper end with the block 197. To prevent disassociation of the parts the said pins 201 and 202 are each provided at its upper end with an enlarged head, respectively 205 and 206, disposed in counter-sinks 207 and 208. The plate 200 has projecting from each of its corners a finger 209, see Fig. 2, giving to said plate 200 an effective area substantially equal to the area of the box bottom panel 35, and the carton stack is positioned with respect to the machine so that the plate 200 is disposed over the said bottom panel of the uppermost stack blank. In order that the said transfer head 195 through its plate 200 will pick up the blank there is provided a pneumatic suction device on the said transfer head.

The pneumatic suction device may take any suitable or desirable form, that illustrated in the drawings comprising, as seen in Fig. 10, adjacent the opposite ends of the plate 200, a suction cup 210 and 211 each carried by a flexible carrier, respectively indicated in its entirety by reference numerals 212 and 213. It will be appreciated that the transfer head is pushed on to the uppermost blank of the stack with considerable force to make sure that the blank and transfer head are connected with one another and since the said stack is non-yieldable, the yieldable connection between the plate 200 and block 197 is provided by the springs 203 and 204 and a yieldable connection is likewise provided in the suction cup carrier mechanisms 212 and 213.

In practice, the suction cups 210 and 211 are connected with a pneumatic or suction pump, wherefore the suction cup 210 has extending from it a flexible conduit 214 while the suction cup 211 has extending from it a similar flexible conduit 215. The flexible conduits 214 and 215 each terminate in a port or duct 216 in the transfer head block 197, with said duct 216 having connected therewith one end of a flexible conduit 217 which has its other end connected to a pneumatic control valve, indicated in its entirety by the reference numeral 218, see Figs. 1 and 8.

The control valve 218 contains a piston type valve 219 movable to two operative positions for alternately connecting the pneumatic suction pump with the transfer head or with the box forming mechanism and which valve will be subsequently described in detail. It should be here noted, and as will presently be made clear, the suction pump when connected with the transfer head is simultaneously connected with a discharge head.

As was noted above, the transfer mechanism 116 and particularly the transfer head 195, transfers a knock-down blank from the stack to the setting up mechanism 183. The setting up mechanism, as noted above, includes the shelf or bracket 119 carried by and laterally projecting from the upright posts 115. Upstanding from said bracket or shelf 119 and supporting the operating elements for the end walls of the box, are pairs of pillars 220 and 221 respectively supporting similar operating elements which respectively set up a box end wall, said mechanisms being respectively indicated, in general, by reference numerals 222 and 223. Since said box end walls setting up mechanisms are substantially identical in construction and operation it is deemed sufficient if but one of them be described in detail for the other.

The mechanism 222 has its pillars 220 respectively disposed on opposite sides of a block 224 mounted for adjustment on a block 225 secured to and carried by the shelf or bracket 119. The block 224 is adapted for axial adjustment relative to the block 225 for thereby adjusting the mechanism 220 toward and from the center of the machine, with said block 224 being securable in its adjusted position through a slot 226 and a clamp bolt 227.

The pillars 220, see Fig. 13, are provided with aligned apertures in which is disposed a shaft 228 to have oscillatably mounted thereon, between the pillars, a sleeve 229. Secured to the sleeve 229 is a tang or tongue 297 that is located between the pillars 220 to extend thereabove and has secured thereto the element which effects the raising or positioning of its box end wall. This element conveniently takes the form of a plate 230 of a length substantially equal to the length of the box end wall, particularly the end wall outer wall member, and the said plate has outwardly projecting from its upper end a ledge or finger 231. The plate height 230 below the finger 231 is substantially equal to the height of the box wall, particularly the box end wall outer wall member.

Disposed on the pillars 220 and 221 is a table 232 on which the knock-down box is disposed by the transfer head. The said knock-down box is retained on the table 232 through any suitable or desirable means, preferably through a suction cup 233 which is substantially identical with the suction cups of the transfer head, wherefore, the suction cup 233 is mounted on a flexible carrier 234 from which extends a flexible conduit 235.

The flexible conduit 235 has its other end connected with the valve mechanism 218.

Each of the box end walls raising mechanisms has projecting from its tang or tongue 297 a furcated ear 236 having pivotly connected therewith one end of a link 237. The other end of the link 237 is pivotly connected to one end of a lever 238 which has its other end pivotally connected to a bracket 239 outwardly projecting from one of the pillars 220. It should be noted that the operating mechanism herein above described for the box end wall raising mechanisms 222 and 223 are offset from one another, that is, one mechanism is to one side of the machine center while the other mechanism is to the opposite side of said machine center.

Each of the levers 238 is adapted to be oscillated upwardly about its pivotal connection with the bracket 239 which through its link 237 and ear 236 effect the oscillation of the plate 230 toward the other, as seen in Fig. 12. In order to actuate the said levers 238, use is made of a cross-head, indicated in general by the reference numeral 240, which is similar to the cross-head 131 that actuates the transfer mechanism.

The cross-head mechanism 240 comprises upstanding guide posts 241 and 242 extending from the bed 85 to the shelf or bracket 119 and on which guide posts are respectively disposed sleeves 243 and 244. The sleeves 243 and 244 are connected with one another by a front plate 245 and by a back plate 246, see Fig. 3. A connecting rod 247 has its upper end pivotly connected through a pin 248 with and between the cross-head plates 245 and 246 with said connecting rod 247 and its lower end journaled on a crank pin 249 projecting from crank 250. The crank 250 has its other end keyed or otherwise secured to the shaft 144 projecting from the adjacent side of speed reducer or crank shaft 145.

Secured to and upwardly extending from the cross-head connecting plates 245 and 246 is a pair of uprights 251 and 252 which extend through and above the shelf or bracket 119 to have secured to their upper ends an actuating plate 253. The actuating plate 253 has secured to it a bumper mechanism for each of the levers 238 which must be yieldable and may take any suitable or desirable form. Each of the bumper mechanisms, as illustrated in the drawings, comprises a housing 254 in which is mounted a yieldable plunger 255. The housing 254 is provided with a laterally projecting tongue 256 through which it is secured to the actuating plate 253.

In practice, and as later will be made more definite, the upward movement of the cross-head 240 carries with it the actuating plate 253 which through the bumpers 254 actuate the levers 238 for thereby raising the box end wall setting up plates 230 from their solid line positions to the dotted line position of the box end raising mechanism 223 in Fig. 12.

The final position of the end wall raising mechanisms 222 and 223, the dotted line position of said mechanism 223 in Fig. 12, is determined by any suitable or desirable means, that shown in the drawing comprising a stop screw 257'. The stop screw 257' is threaded through a lug 258' secured in any suitable or desirable manner to the bracket 239. The lug is so formed that the stop screw 257 is in the line of movement of the lever 238, and upon engagement of said lever 238 and stop screw 257 further upward movement of the actuating plate 253 merely compresses the spring associated with the yieldable bumper mechanism plunger 255.

The side walls raising mechanisms are mounted at right angles to the end walls raising mechanisms and are illustrated in Figs. 14, 15 and 16, with each side wall raising mechanism being substantially identical and respectively indicated in general by the reference numerals 257 and 258. The said mechanisms each includes a pair of pillars 259 and 260 which support for operation substantially similar elements and it is deemed sufficient if but one of said raising mechanisms per se, be described in detail.

Accordingly, and as seen in Fig. 15, the pillars 259, of the side wall raising mechanism 257, are provided in axial alignment with apertures in which is secured a shaft 261 on which is oscillatably mounted a sleeve 262. Secured to the sleeve 262 is a tongue 263 for supporting the side wall raising plate 264. The side wall raising plate 264, similar to the end wall raising plate 230, has projecting therefrom near its outer end a tongue 265 spaced from the effective lower end of the plate a distance substantially equal to the height of said side walls and particularly the outer wall member thereof. The plate 264 has a length substantially identical with the length of the side wall outer wall member and the said plate 264 is provided at its ends with wings 266 and 267, see particularly Fig. 16.

Outwardly projecting from the tongue 263 is a furcated ear 268 receiving one end of a link 269. The other end of the link 269 is pivotally connected with an oscillatable quadrant 270 pivotally mounted through an integral sleeve on a shaft 271 carried by and between the pillars 259 at point below the shaft 261. Pivotally connected with the quadrant 270 is one end of a second link 272 which has its other end pivotally connected to an arm 273 carried by and laterally projecting from the actuating plate 253, and it should be noted that the side walls operating mechanisms, similar to the end walls operating mechanisms, as above set forth, are laterally offset with respect to one another and with respect to the vertical center through the machine.

The pillars 259 and 260, similar to the pillars 220 and 221, are respectively secured to a block 274 mounted on and axially adjustable with respect to a second block 275 secured to and carried by the shelf or bracket 119. The block 274 is adapted to be secured in its adjusted positions through a clamp bolt 276 passing through an elongated aperture 277 in the block 274.

It will be noted that there is provided lost motion or space between the bumper 254 and the lever 238 while there is no lost motion between the arm 273 and the side wall erecting mechanisms. The reason for this is to permit the side wall actuating mechanisms to partially raise the said side walls and through their wings 266 and 270 to partially dispose the tucking flaps of the box transversely of the box bottom panel so that upon the raising of the end walls the said tucking flaps are inwardly of the end walls outer wall members and to be enfolded by said end walls inner and outer wall members upon final erection.

The box side and end walls raising mechanisms merely raise the outer wall members to be normal to the box bottom panel which in connecting with the said walls automatically positions their inner wall members and top wall members to be respectively normal to and parallel with the bottom panel. The end walls must have their inner wall members folded inwardly of the box or carton. This folding of the end walls inner wall members is initiated by the tongues 231 of the end wall erecting mechanisms 222 and 223. In other words, the portion of the end wall extensions beyond the score or fold lines 59 in the blank illustrated in Fig. 27, and the portions of the end walls beyond the score or fold lines 75 in the blank illustrated in Fig. 30 are substantially immediately actuated toward a horizontal position upon engagement of said end walls extensions by the said folding mechanisms 222 and 223 due to the fact that the said tongues engage said end walls extensions at points just beyond or above said score or fold lines 59 and 75. At this time the mechanism illustrated to the left of the box folding mechanism, in Fig. 1 and indicated in general by the reference numeral 278, is brought into operation as now will be made clear.

The mechanism 278 may be termed the final setup mechanism and discharge mechanism and comprises a pair of outwardly and upwardly inclining supporting standards 279 and 280 secured to and outwardly extending from the left hand end of the bracket or shelf 119. The mechanism 278, as most clearly illustrated in detail in Figs. 1, 2, 3 and 18 to 22, comprises a shaft 281 oscillatably mounted in bearings 282 and 283 respectively carried by and outwardly projecting from the standards 279 and 280. The shaft 281 has keyed or otherwise secured thereto, intermediate its ends, a sprocket 284 about which is trained a sprocket chain 285. The sprocket chain 285 has its ends 286 and 287 respectively connected through studs 288 and 289 with pivot pins 290 and 291 projecting from a driving plate 292 keyed or otherwise secured to a driving shaft 293. The shaft 293 is oscillatably mounted in bearings 294' and 295' which downwardly projects from an extending portion of the bracket or shelf 119.

The shaft 293 is driven in timed relation with the transfer mechanism and is therefore driven from the actuating shaft 117 of the transfer mechanism. Accordingly the shaft 293 is provided intermediate its ends with a sprocket 294 about which is trained a sprocket chain 295 that in turn is trained about a sprocket 296 keyed or otherwise secured to the driving shaft 117.

From the foregoing it will be noted that cross-head 131 actuates the oscillating shafts of the transfer mechanism as well as the final setup and discharge mechanism.

The discharge mechanism shaft 281, similar to the transfer mechanism shaft 123, is counter-balanced by a counter-balancing spring 298 which has its one end attached to a finger 299 projecting from a collar 300 keyed or otherwise secured to the said shaft 281, and with said spring having its other end secured to a lug 301 projecting from the standard 280. The counter-balance is desirable in this instance since the discharge mechanism is in the form of a swinging frame of the order of the frame of the transfer mechanism.

The final setup and discharge mechanism comprises a pair of arms 302 and 303 respectively secured to the ends of the oscillating shaft 281 with said arms carrying between their outer ends a shaft 304 on which is mounted the said final setup mechanism and discharge mechanism which is in the form of a head indicated in general by the reference numeral 305.

The mounting of the final setup and discharge head 305 on the shaft 304 is quite similar to the mounting of the transfer head on its supporting shaft and comprises a sleeve 306 oscillatedly mounted on the shaft 304 between one arm, arm 302 for example, and a block 307. The block 307 is secured to the sleeve 306 in any suitable or desirable manner so as to partake of any rotary or oscillatory movement given to said sleeve. The connection of the sleeve 306 and block 307 may be by way of a collar or flange 308 carried by the sleeve 306 and secured to the block 307.

The head 305, similar to the transfer head 195, is maintained in a vertical position during its movement between its final set up position and its discharge position by means substantially similar to the means which operate on the mounting of the said transfer head. This means includes a sprocket 410, see Fig. 18, keyed or otherwise secured to the sleeve 306, and said sprocket has trained thereabout a sprocket chain 411. The sprocket chain 411 is, in turn, trained about a sprocket 412 loosely journaled on the oscillatable shaft 281, see Fig. 2. The sprocket 412 is anchored against movement in the same manner as the sprocket 187, see Figs. 1 and 8, namely, through an ear 413 depending from the sprocket 412 having connected therewith one end of a pin 414 and which pin 414 has its other end welded or otherwise secured to the adjacent supporting standard 279.

It will be understood that since the arms 302 and 303 are secured to the actuating or oscillatable shaft 281 they oscillate with said shaft 281 and since the sprocket 412 is held against movement the sprocket chain 411 will be caused to travel around the said sprocket 412 and thereby rotate or oscillate the sprocket 410 and the parts connected therewith, such as, the sleeve 306 and the head 305 for maintaining the said head with its axis vertical during the movement thereof between its discharging position and its position for positioning the end walls inner wall members.

The head 305 includes at the lower edge of the block 307 a beam 309 having its opposite ends furcated and respectively having pivotally connected thereto one end of a link 310 and 311. The links 310 and 311 each has its other end respectively pivotally connected with a bracket 312 and 313 inwardly projecting respectively from a plate 314 and 315. The plates 314 and 315 are respectively secured to a sleeve 316 and 317 respectively mounted on a shaft 318 and 319 that extend between depending side plates 320 and 321 at the ends of a carrier plate 322.

The carrier plate 322 is located below the head block 307 being maintained in operative position and association with the block 307 by pins 323 and 324 which are carried by and depend from the block 307. Encircling the pins 323 and 324 are sleeves 325 and 326 which upstand from the plate 322 but stop short of the under surface of the block 307. The sleeves 325 and 326 are for the purpose of limiting the movement of the plate 322 toward the block 307 and performing the function of box wall folding as will subsequently be made clear. In normal operation the plate 322 is yieldably maintained below the block 307 and this position is established by an enlarged head 327, at the upper end of each of the pins 323 and 324 operating in a depression or countersink 328 let into the upper end of the block 307. This spacing of the parts is yieldably maintained by expansion coil springs 329 and 330 respectively encircling the pins 323 and 324 and the associated sleeves.

The carrier plate 322 inwardly of each of its end plates 320 and 321 has depending therefrom a slide bracket 331 and 332 each having formed therein inwardly of its outer face, a dove tail guide-way 333 and 334. Mounted in each of the said dove tail guide-ways is a dove tail guide 335 and 336 respectively inwardly projecting from a slide 337 and 338. Each of the slides has rotatably mounted at its lower end a roller 339 and 340, which has been conveniently formed as a roller but need not take this specific form as the functions performed thereby is that of cams rather than rollers as presently will be made clear.

Figure 21:
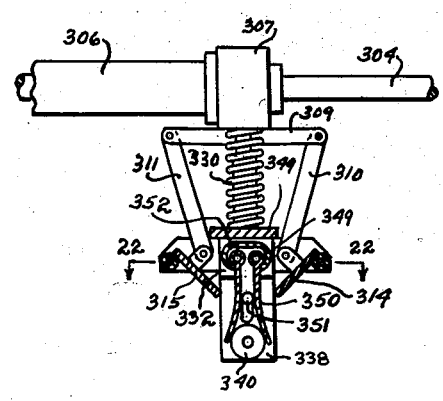
Fig. 21 is a vertical sectional view similar to Fig. 19 taken in a plane to the left of said Fig. 19 as seen from line 21—21 on Fig. 20.
Figure 22:
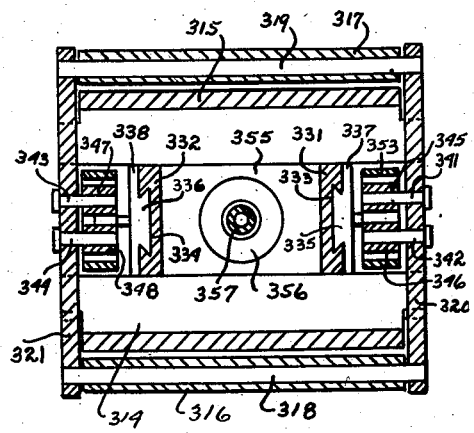
Fig. 22 is an enlarged horizontal sectional view as seen from line 22—22 on Fig. 21.

Substantially midway of the length of each side plate 320 and 321 there is provided inwardly projecting pins, there being two pins on each side plate, those for side plate 320 being indicated by reference numerals 341 and 342 while the pins from the side plate 321 are indicated by the reference numerals 343 and 344. Mounted on each of the said pins 341–344 is a similar member those on pins 343 and 344 being illustrated in cross-section in Fig. 21. Said members are indicated in the drawings by reference numerals 345, 346, 347 and 348 and each of said members is provided at its upper end with a bored enlargement 349 through which it is mounted on its pin and from which enlargement depends a finger 350 that, in its normal position, terminates at about center of the rollers or cams 339 or 340 located therebelow. The members 345 and 346 are yieldingly retained in their normal positions of having their lower ends in contact with the roller or cam 349 by a spring 352 which is substantially U-shaped and has its arms engaging with said members 345 and 346 below their enlargement 349. A similar U-shaped spring 353 is provided for the members 347 and 348. As seen in Fig. 21, the spacing of the upper or enlarged ends 349 of the said members is less than the spacing between the outturned lower ends of their body portions. It will be noted that said body portions between their free outer ends and enlargements are outwardly arcuately formed.

The slides 337 and 338 are adapted to be actuated relative to their slide brackets 331 and 332 but this relative movement is limited by a pin and slot connection 351 between the parts as clearly illustrated in Fig. 21.

The operation of this final erection head is as follows:

After the knocked-down box of Fig. 27 has had its side walls upwardly disposed and its end walls have had their outer wall members similarly upwardly disposed, the portions of the end wall extensions beyond the score or fold line 59 is lying on the side wall top wall members through the agency of the locking lugs 66. The downward movemet of the head 305 causes the corners of the slides 337 and 338 to engage with and depress the end walls inner and outer wall members spacing flaps 65 of each end wall extension to a position to downwardly extend with respect to the end walls inner members or panels 64. During the said bending of the spacer flaps the end walls extensions panels 64 are retained in position on the side walls top wall members through the locking lugs 66 projecting therefrom. At this time the head 305 is within the box sufficiently that the plates 314 and 315 are in contact with the inner edge of their respective end wall inner wall member and the said slides 337 and 338 are engaging the bottom panel of the box. Continued downward movement of the head 305 causes the slides 337 and 338 to be actuated upwardly of their slide brackets, or toward the carrier plate 322, and at the same time the rollers or cams 339 and 340 moving upwardly with the slides, as respects the members 345–348 causes them to outwardly oscillate on their pins 341–344 against the resistance of their springs 352 and 353. The members 345–348 are disposed below and, due to their arcuate formation, engage the lower edges of the end walls inner wall members, and in fact, engage with the spacer flaps for keeping them folded during the positioning of the end walls inner wall members.

When the slides 337 and 338 reach the upper limit of travel as determined by the pin and slot 351, continued downward movement of the head assembly 305, particularly continued downward movement of the block 307, causes the beam 309 through the links 310 and 311 to oscillate the plates 314 and 315 outwardly on their shafts 316 and 317 and thereby force the end walls inner wall members to their operative positions, which is, adjacent to and parallel with the outer wall members. It will be understood that this positioning of the inner wall members is about the score or fold lines 60 and with the top will members retained in position by the ends thereof resting on the side wall top wall members as well as resting on the spacer lugs 56 and 68 projecting respectively from the spacer flap and side walls inner wall members.

At this time the end walls are completely and fully positioned with their inner wall member locking lugs disposed in the side wall locking slots. The head 305 has reached its lowermost position and is about ready for withdrawal and return to its original position. At this time also, the suction cup 354 carried by a bridging piece 355 between the slide brackets 331 and 332 engages with the bottom panel of the now setup box so that withdrawal of the head 305 carries with it the completed and setup box.

The suction cup 354, similar to the suction cups above referred to and described, is mounted in a flexible carrier 356 at the end of a pipe or conduit 357 which has connected to its upper end a flexible pipe or conduit 358 that terminates in the valve mechanism 218.

As was noted above, the valve mechanism 218 is provided with a piston type valve 219 and as will be seen in Fig. 8 the said valve is disposed in a bore in a valve block 359 and has a pair of reduced portions 360 and 361. The valve 219 has two operative positions whereby its reduced portion 360 will connect a port 362 alternately with ports 363 and 364 and whereby its reduced portion 361 will alternately connect port 365 with port 364 and port 366. Port 364 is an inlet port and connected by a conduit 367 with the pneumatic suction pump while ports 363 and 366 are exhaust ports to the atmosphere through suitable protecting outlet housings. The remaining ports 362 and 365 have respectively connected therewith the flexible conduits from the transfer head and the box forming mechanisms and at the same time the port 362 has connected therewith the final setup head and discharge mechanism. In other words, it is with the port 362 that the other end of flexible conduit 217 connects and it is also with this port 362 that the other end of the flexible conduit 358 connects unless the said flexible conduit 358 is connected directly with the conduit 217, and it is with the port 365 that the other end of the flexible conduit 235 connects.

The valve 219 is provided with an extension or valve stem 368 conveniently threaded throughout its length to receive stops 369 and 370, conveniently in the form of nuts threaded on the threaded valve stem, through which the valve 219 is shifted to its operative positions. The said operative positions of the valve 219 are determined by a spring operated detent 317 that cooperates with the usual seats formed in the said valve 219. The valve 219 is shifted through a valve shifter 372 secured to and operated by the reciprocating frame 130.

As was noted above, the suction pump is connected with the transfer head at the time of its picking up a knock-down box and is disconnected therefrom at the time the said knock-down box is disposed on the setup mechanism table 232, wherefore the valve actuator 372 is mounted on the frame 130 so as to shift the valve as the frame approaches its opposite limits of reciprocation and which is its positions when picking up a knock-down box from the stack and the placing thereof on the setup mechanism table.

Any suitable or desirable suction pump may be provided for supplying the machine, that shown on the drawings comprising a commercial suction pump 373 to the outlet of which the other end of the pipe or conduit 367 is connected. The suction pump shaft is connected through the usual coupling 374 with the shaft of an electric motor 375. The motor 375 and pump 373 are supported on a shelf 376 that depends through brackets 377 from the bed 85.

Mounted on said shelf 376 is a second electric motor 378 having keyed or otherwise secured to its shaft, a pulley 379 and about which is trained the belt 147 for driving the countershaft or speed variator 145, as above set forth.

It is believed that the setting up of a knock-down box such as disclosed in Figs. 27, 28 and 29 is obvious from the foregoing but briefly the method is as follows:

A stack of knock-down boxes is placed on the platform 87 and the said platform elevated to the point where the uppermost box blank positions the trigger 156 to substantially the position illustrated in Figs. 1 and 5 whereupon the motors 378 and 375 are started for respectively actuating the countershaft or speed reducer 145 and effecting a sutcion pressure within the pump 373. The operation of the counter-shaft 145 causes the cross-head 131, through the flexible rack or sprocket chain 121, to operate the transfer mechanism 116 to dispose its pickup head on the uppermost knock-down box of the stack. As soon as the said pickup head is properly positioned the valve shifter 372 shifts the valve 219 to the position opposite of that shown in the drawing thereby connecting the pump 373 through the conduit 367 with the conduit 217 and the pickup head for connecting the uppermost knock-down box with said head.

The said cross-head 131 immediately reverses thereby reversely actuating the transfer mechanism 116 to cause its pickup head to move to a position over and on the forming mechanism table 232. At this time the cross-head 131 is at its lower limit of movement whereupon the valve actuator 372 shifts the valve 219 to the position illustrated in Fig. 8 for disconnecting the pump from the transfer head to the box forming mechanism and causing the said knock-down box to be secured on the table 232.

At this time the cross-head 240 is elevated to cause the upright members 251 and 252 together with the plate 253 to ascend. The ascension of the plate 253 through the arms 273 and connecting links 272 oscillate the box side wall setting up mechanisms 257 and 258 from their lower positions as illustrated in solid lines in Fig. 14 to the dotted line position of the mechanism 258 in said Fig. 14. At the same time that the side walls are being positioned the wings 266 and 267 of each of said side wall positioning mechanisms shift the tucking flaps of the knock-down box to be transversely of the box bottom panel.

After the side walls have been partially raised, or upon the taking up of the clearance beween bumpers 255 and links 232, as seen in Fig. 12, the plate 253 through said bumpers 255 respectively actuate their links 238 or actuating the end walls setting up mechanisms 222 and 223. This setting up of the end walls is effected by shifting the said mechanisms 222 and 223 from their solid line positions in Fig. 12 to the dotted line position of the mechanism 223.

It will be noted that the side walls mechanisms operate slightly in advance of the end walls mechanisms and this is for the purpose of insuring the positioning of the tucking flaps at the ends of the side walls inwardly and transversely of the carton before the operation of the end walls and so that the said tucking flaps are within the end walls inner and outer wall members. It will also be noted that the throw of the side wall setting up mechanisms 257 and 258, while substantially of the same amount as the throw of the end wall setting up mechanisms 222 and 223, the side wall setting up mechanisms is prevented from over-throwing through the linkage and quadrant arrangement disclosed in Fig. 14 whereby when the said side walls positioning mechanisms 257 and 258 reach their vertical positions further movement is arrested, or a dwell effected, until the said end wall setting up mechanisms have completed their functions. The said side wall setting up mechanisms are given a slight overthrow to insure the proper inter-engagement of the end walls inner wall members locking lugs with the side walls inner wall members locking slots.

The final setting up head and erected box discharging mechanism is driven in timed relation with the transfer head and driven from the same mechanism all as above set forth. Wherefore, as soon as the transfer head has been withdrawn sufficiently from the delivery position the final setup and discharge head 305 of the mechanism 278 is in position for entering the now partially erected box. This head 305 through its slides 337 and 338 downwardly turn the spacer flaps of the carton end walls which movement of the head 305 continues until the said slides 337 and 338 bottom on the carton bottom panel and at which time the said spacer flaps are at an inward angle to the end walls inner wall members.

Continued downward movement of the head 305 causes the slides 337 and 338 to move upwardly relative to the slide brackets 331 and 332 thereby oscillating members 350 outwardly or toward the box end walls and thereby guiding the spacer flaps to their positions beneath the end walls inner wall members. As soon as the slides 337 and 338 have reached the limit of their movement as determined by the pin and slot 351 the entire head moves against the yielding resistance of springs 325 and 326. The movement of the head with respect to its carrying block 307 causes the links 310 and 311 to outwardly oscillate plates 314 and 315 which at this time are in face contact with the end walls inner wall members for shifting or forcing said end walls inner wall members to their operative positions. This movement of the plates 314 and 315 is limited by the engagement of the sleeves 325 and 326 with the under surface of the block 307.

At this time all of the parts of the box setting up mechanism are in their final positions and the transfer mechanism head 193 is again over the uppermost knock-down box of the stack, and the valve 219 is again shifted for disconnecting the suction pump from the setting up mechanism and connection to the transfer mechanism as well as connecting the suction pump with the final setup and discharge head 305. A fresh knock-down box is thereby connected with the transfer mechanism while the completed box is now connected with the suction cup 354 of the discharge head 305.

The completed box is now removed from the setting up mechanism for discharge from the machine either into a container or onto a discharge conveyor belt, neither of which devices is disclosed in the drawing.

The modified final setup and discharge head illustrated in Figs. 23 through 26 operates in the same manner as the final setup and discharge head 305 and is connected with the shaft 304 and its oscillatable sleeve 306 in the same manner. This modified head 380 is connected to the carrier block 307 through pins 323 and 324 and comprises an actuating plate 381 having its opposite ends furcated to respectively receive and oscillatably support tongues 382 and 383 through pins 384 and 385. The tongues 382 and 383 respectively have secured to their lower ends, plates 386 and 387. Each of the tongues 382 and 383 above the actuating plate 387 has threaded therethrough abutment screws 388 and 389 and each tongue has threaded therethrough below the operating plate, second abutment screws 390 and 391. The said abutment screws of the tongue 382 are adapted to abut a post 392 carried by and projecting from opposite sides of the plate 381 inwardly of its one end while the said abutment screws of the tongue 383 are likewise adapted to abut a post 393 carried by and projecting from opposite sides of the plate 381 inwardly of its other end. The tongues and plates are retained in their normal positions, illustrated in Fig. 25, by expansion coil springs 394 and 395 respectively disposed on and retained in position by the abutment screws 388 and 389, and with said spring 394 abutting at opposite ends with the tongue 382 and post 392 for holding the tongue 382 in position to have its abutment screw in abutment with post 392, while the spring 395 abuts on opposite ends with the tongue 383 and the post 393 to hold the tongue 383 in the illustrated position and with its abutment screw 391 in abutment with post 393.

Carried by the lower ends of the posts 392 and 393, is a strap 396, for a purpose subsequently to be made clear. The post 392 further has secured to its lower end, one arm or leaf 397 of a leaf spring 398 which has a second arm 399 downwardly and inwardly inclining while the first arm 397 of the leaf spring 398 downwardly and outwardly inclines with said spring arms or leaves being joined by an arcuate portion 400 which is in contact with the plate 386. The post 393, similarly, and in addition, has secured thereto one arm 401 of a second leaf spring 402 which includes a second arm 403 downwardly and inwardly inclining while the first arm downwardly and outwardly inclines and with said arms 401 and 403 joined by an arcuate portion 404 that contacts with the plate 387.

The bridge 397 is provided for the purpose of supporting a suction cup 405 through a flexible carrier 406 for the same purpose as the suction cup 354 of final setup and discharge head 305. The suction cup 405 is connected through a tubular sleeve 407 with flexible conduit 358 that terminates in the valve block 359 in the same manner as flexible conduit 358.

In operation the modified final setup and discharge head 380 operates through the plates 386 and 387 when in their normal positions as illustrated in Fig. 25 for downwardly disposing the end walls inner wall members 78 until the said outer edges of the creeper flaps 79 engage with the bottom panel. The parts are so positioned that the plates 386 and 387 are located at about the fold lines 76 between the said end walls inner wall members and the creeper flaps and the said inner wall member is positioned with the outer edge of the creeper flaps 79 against the box bottom panel at about the time that the inner or free ends of the leaf spring arms 399 and 402 engage said box bottom panel. Continued downward movement of the final setup and discharge head 380 causes the said arms 399 and 402 to be upwardly pushed which causes an elongation in the leaf springs and an outward shifting of their arcuate portions 400 and 404 for correspondingly outwardly moving plates 386 and 387 respectively on their pivot pins 384 and 385. This movement of the said plates 386 and 387 is against the resistance of springs 394 and 395 but continues until the abutment screws 388 and 389 engage posts 392 and 393.

At this time the end walls are completely erected and the locking lugs 81 of the end walls inner wall members are within the spaces provided in the side walls by the bias or angular cuts 73 at the lower corners of said side walls inner wall members.

The said side walls of the modified carton in Figs. 30, 31, and 32 were set up in the same manner as above described in connection wtih the carton illustrated in Figs. 27, 28 and 29 by the forming mechanism 183.

From the foregoing, it will now be appreciated that there has been provided a box setting up machine that accomplishes the objects initially set forth.

What is claimed is:

1. In a box setting up machine for a box that includes a bottom panel and side and end walls hingedly carried by said bottom panel, the combination of a bed, means on said bed for supporting a supply of knocked-down boxes, means carried by said bed for setting up the side and end walls of said knocked-down box including a table receiving the bottom panel of the knocked-down box, transfer means carried by said bed between the supply of knock-down boxes and the setting up means for transferring said knocked-down boxes individually and sequentially to the box setting up means, said transfer means including a plate for engagement with the knocked-down box bottom panel, discharge means carried by the bed beyond the box setting up means for removing a set-up box from the setting up means table and discharging same from the machine, a suction cup associated with the box setting up means table, a suction cup associated with said transfer means plate, and a suction cup associated with the discharge mechanism and through which suction cups said knocked-down blank is connected with the transfer means, the knocked-down box secured to the setting up mechanism table, and the set-up box connected with the discharge means.

2. In a box setting up machine for a box that includes a bottom panel and side and end walls hingedly carried by said bottom panel, the combination of a bed, means on said bed for supporting a supply of knocked-down boxes, means carried by said bed for setting up the side and end walls of said knocked-down box including a table receiving the bottom panel of the knocked-down box, transfer means carried by said bed between the supply of knocked-down boxes and the setting up means for transferring said knocked-down boxes individually and sequentially to the box setting up means, said transfer mechanism including a plate for engagement with the knocked-down box bottom panel, discharge means carried by the bed beyond the box setting up means for removing a set-up box from the setting up means table and discharging same from the machine, a suction cup associated with the box setting up means table, a suction cup associated with said transfer means plate, a suction cup associated with the discharge mechanism and through which suction cups said knocked-down blank is connected with the transfer means, the knocked-down box secured to the setting up mechanism table and the set-up box connected with the discharge means, and power operated means for providing a source of pneumatic pressure for said suction cups for rendering same operative only during transfer, discharge, and the setting up of the box.

3. In a box setting up machine for a box blank that includes a bottom panel and side and end walls hingedly carried by the bottom panel and wherein said end walls include inner and outer wall members and said side walls include tucking flaps at their ends for enfoldment by the end walls inner and outer wall members, the combination of a table on which the knocked-down box bottom panel is disposed, means on said table for forcefully holding the knocked-down box bottom panel thereto, oscillatable plates pivotally mounted adjacent opposite sides of said table for raising the knocked-down box side walls and disposing the tucking flaps inwardly and transversely of the box bottom panel, additional oscillatable plates mounted adjacent to the remaining sides of the table for raising the end walls outer wall members and disposing the said end walls inner wall members at an angle to the outer wall members, power operated means for actuating said plates, and means independently of the end walls outer wall members oscillatable plates for inwardly folding the end walls inner wall members to be parallel with the end walls outer wall members.

4. In a box setting up machine for a box blank that includes a bottom panel and side and end walls hingedly carried by the bottom panel and wherein said end walls include inner and outer wall members and said side walls include tucking flaps at their ends for enfoldment by the end walls inner and outer wall members, the combination of a table on which the knocked-down box bottom panel is disposed, means on said table for forcefully holding the knocked-down box bottom panel thereto, oscillatable plates pivotally mounted adjacent opposite sides of said table for raising the knocked-down box side walls and disposing the tucking flaps transversely of the box bottom panel, additional oscillatable plates mounted adjacent to the remaining sides of the table for raising the end walls outer wall members and disposing the said end walls inner wall members at an angle to the outer wall members, power operated means for actuating said plates, and means for inwardly folding the end walls inner wall members to be parallel with the end walls outer wall members, including a head adapted to enter the box during the raising of the side and end walls, and oscillatable plates carried by said head operable for actuating the end walls inner wall members toward the end walls outer wall members.

5. In a box setting up machine for a box blank that includes a bottom panel and side and end walls hingedly carried by the bottom panel and wherein said end walls include inner and outer wall members and said side walls include tucking flaps at their ends for enfoldment by the end walls inner and outer wall members, the combination of a table on which the knocked-down box bottom panel is disposed, means on said table for forcefully holding the knocked-down box bottom panel thereto, oscillatable plates pivotally mounted adjacent opposite sides of said table for raising the knocked-down box side walls and disposing the tucking flaps transversely of the box bottom panel, additional oscillatable plates mounted adjacent to the remaining sides of the table for raising the end walls outer wall members and disposing the said end walls inner wall members at an angle to the outer wall members, power operated means for actuating said plates, means for inwardly folding the end walls inner wall members to be parallel with the outer walls end wall members, including a head adapted to enter the box during the raising of the side and end walls, oscillatable plates carried by said head operable for actuating the end walls inner wall members toward the end walls outer wall members, and means associated with said head for picking up the erected box after erection and removing same from the table.

6. In a box setting up machine for a box that includes a bottom panel having integrally, hingedly, connected opposed end walls and integrally, hingedly, connected opposed hollow side walls, said side walls, respectively, including an inner wall member, an outer wall member, a top wall member, and tucking flaps at the ends of the side walls, having, in combination, a supporting table of an area substantially equal to the area of and receiving a knocked-down box bottom panel, retaining means on said table for engaging and retaining the box bottom panel on said table, oscillatable plates at two opposed edges of the table for engaging the side walls outer wall members, wings carried by and normal to said plates at the ends thereof for engaging said tucking flaps and actuating same to be normal to the plates and box side walls, and vertically reciprocable means for oscillating the plates to positions normal to the table, including a cross-head, an actuating plate, means connecting the cross-head and actuating plate, and linkage between said actuating plate and oscillatable plates.

7. In a box setting up machine for a box that includes a bottom panel and integrally, hingedly, connected opposed end walls, each end wall, respectively, including an inner wall member and an outer wall member, and integrally hingedly connected opposed hollow side walls, said side walls, respectively, including an inner wall member, an outer wall member, a top wall member, and tucking flaps at the ends of the side walls, having, in combination, a supporting table of an area substantially equal to the area of and receiving a knocked-down box bottom panel, retaining means on said table for engaging and retaining the box bottom panel on said table, oscillatable plates at two opposed edges of the table for engaging the side walls outer wall members, wings carried by and normal to said plates at the ends thereof for engaging said tucking flaps and actuating same to be normal to the plates and box side walls, oscillatable plates at the remaining edges of the table for engaging and raising the end walls outer wall members, tongues on said last mentioned oscillatable plates for engaging the end walls inner wall members for disposing same at an angle to the end walls outer wall members, vertically reciprocable means for actuating said side walls and end walls oscillatable plates, including a cross-head, an actuating plate, means connecting the cross-head and actuating plate, linkage between said actuating plate and oscillatable plates, and means in said actuating means setting up lost motion between the actuating plate and end walls oscillatable plates whereby said side wall oscillatable plates are actuated in advance of the actuation of the end walls plates.

8. In a box setting up machine for setting up a box that includes a bottom panel and integrally, hingedly, connected opposed side walls, and integrally, hingedly, connected opposed end walls, said end walls, respectively, including an outer wall member and an inner wall member, having, in combination, a supporting table of an area substantially equal to the area of and receiving a knocked-down box bottom panel, retaining means on said table for engaging and retaining the box bottom panel on said table, oscillatable plates oscillatably mounted adjacent the sides and ends of said table respectively engaging the box side walls and end walls outer wall members, tongues carried by the end walls outer wall members oscillatable plates engaging the knocked-down box end walls inner wall members for disposing same at an angle to their outer wall members and positioning said inner wall members on the side walls parallel with the box bottom panel, and means independently of the end walls outer wall members oscillatable plates for actuating said box end walls inner wall members to positions to be parallel with their outer wall members.

9. In a box setting up machine for setting up a box that includes a bottom panel and integrally, hingedly, connected opposed side walls, and integrally, hingedly, connected opposed end walls, said end walls, respectively, including an outer wall member and an inner wall member, having, in combination, a supporting table of an area substantially equal to the area of and receiving a knocked-down box bottom panel, retaining means on said table for engaging and retaining the box bottom panel on said table, oscillatable plates oscillatably mounted adjacent the sides and ends of said table respectively engaging the box side walls and end walls outer wall members, tongues carried by the end walls outer wall members oscillatable plates engaging the knocked-down box end walls inner wall members for disposing same at an angle to their outer wall members and positioning said inner wall members on the side walls parallel with the box bottom panel, means independently of the end walls outer wall members oscillatable plates for actuating said box end walls inner wall members to positions to be parallel with their outer wall members and means for sequentially actuating the end wall outer wall members oscillating plates and the end walls inner wall members actuating means.

10. In a box setting up machine for setting up a box that includes a bottom panel and integrally, hingedly, connected opposed side walls, and integrally, hingedly, connected opposed end walls, said end walls, respectively, including an outer wall member and an inner wall member, having, in combination, a supporting table of an area substantially equal to the area of and receiving a knocked-down box bottom panel, retaining means on said table for engaging and retaining the box bottom panel on said table, oscillatable plates oscillatably mounted adjacent the sides and ends of said table respectively engaging the box side walls and end walls outer wall members, tongues carried by the end walls outer wall members oscillatable plates engaging the knocked-down box end walls inner wall members for disposing same at an angle to their outer wall members and positioning said inner wall members on the side walls parallel with the box bottom panel, means for actuating said box end walls inner wall members to positions to be parallel with their outer wall members, including a head operable to enter the box upon positioning of the end walls inner wall members on the side walls, means carried by said head engaging and downwardly disposing said end walls inner wall members, and means for sequentially actuating the end wall outer wall members oscillating plates and the end walls inner wall members actuating means.

11. In a box setting up machine for setting up a box that includes a bottom panel and integrally, hingedly, connected opposed side walls, and integrally, hingedly, connected opposed end walls, said end walls, respectively, including an outer wall member and an inner wall member, having, in combination, a supporting table of an area substantially equal to the area of and receiving a knocked-down box bottom panel, retaining means on said table for engaging and retaining the box bottom panel on said table, oscillatable plates oscillatably mounted adjacent the sides and ends of said table respectively engaging the box side walls and end walls outer wall members, tongues carried by the end walls outer wall members oscillatable plates engaging the knocked-down box end walls inner wall members for disposing same at an angle to their outer wall members and positioning said inner wall members on the side walls parallel with the box bottom panel, means for actuating said box end walls inner wall members to positions to be parallel with their outer wall members, including a head movable to enter the box upon positioning of the end walls inner wall members on the side walls, an oscillatable plate for each end wall inner wall member carried by the head, and means operable through the movement of the head for oscillating said plates and actuating the end wall inner wall members into positions parallel with the end walls outer wall members, and means for sequentially actuating the end wall outer wall members oscillating plates and the end walls inner wall members actuating means head.

12. In a box setting up machine for setting up a box that includes a bottom panel, integrally, hingedly, connected opposed side walls, integrally, hingedly, connected opposed end walls, said end walls, respectively, including an inner wall member, an outer wall member, a top wall member and a spacer flap at the end of the inner wall member, having, in combination, a supporting table of an area substantially equal to the area of and receiving the box bottom panel, retaining means on said table for engaging and retaining the box bottom panel on said table, an oscillatable plate mounted adjacent each of two opposed edges of the table for engagement with and raising of the box side walls, an oscillatable plate adjacent each of the remaining edges of the table for engagement with and raising of the end walls outer wall members, tongues carried by the end walls oscillatable plates for engagement with the end walls top wall members for disposing same and the end walls inner wall members and spacer flap at an angle to their outer wall members, power actuated means for oscillating said plates for disposing the side walls and end walls inner wall members normal to the box bottom panel and disposing the end walls top wall members, end walls inner wall members and end walls spacer flaps on the side walls and parallel with the bottom panel, and means for sequentially positioning the end walls spacer flaps normal to the end walls inner wall members and the end walls inner wall member normal to the end wall top wall members and disposing said end walls inner wall members parallel with the end walls outer wall members and the spacer flaps between the end walls inner and outer wall members.

13. In a box setting up machine for setting up a box that includes a bottom panel, integrally, hingedly, connected opposed side walls, integrally, hingedly, connected opposed end walls, said end walls, respectively, including an inner wall member, an outer wall member, a top wall member and a spacer flap at the end of the inner wall member, having, in combination, a supporting table of an area substantially equal to the area of and receiving the box bottom panel, retaining means on said table for engaging and retaining the box bottom panel on said table, an oscillatable plate mounted adjacent each of two opposed edges of the table for engagement with and raising of the box side walls, an oscillatable plate adjacent each of the remaining edges of the table for engagement with and raising of the end walls outer wall members, tongues carried by the end walls oscillatable plates for engagement with the end walls top wall members for disposing same and the end walls inner wall members and spacer at an angle to their outer wall members, power actuated means for oscillating said plates for disposing the side walls and end walls inner wall members normal to the box bottom panel and disposing the end walls top wall members, end walls inner wall members and end walls spacer flaps on the side walls and parallel with the bottom panel, and means for sequentially positioning the end walls spacer flaps normal to the end walls inner wall members and the end walls inner wall member normal to the end wall top wall members and disposing said end walls inner wall members parallel with the end walls outer wall members and the spacer flaps between the end walls inner and outer wall members, including a head, a slide depending from said head, yieldable means for holding said slide in position for engagement with and positioning of said end walls spacer flaps with respect to the end walls inner wall members, and oscillatable plates operable after said slide has positioned the spacer flaps for engaging and actuating the end walls inner wall members to positions parallel with their end walls outer wall members.

14. In a box setting up machine for setting up a box that includes a bottom panel, integrally, hingedly, connected opposed side walls, integrally, hingedly, connected opposed end walls, said end walls, respectively, including an inner wall member, an outer wall member, a top wall member and a spacer flap at the end of the inner wall member, having, in combination, a supporting table of an area substantially equal to the area of and receiving the box bottom panel, retaining means on said table for engaging and retaining the box bottom panel on said table, an oscillatable plate mounted adjacent each of two opposed edges of the table for engagement with and raising of the box side walls, an oscillatable plate adjacent each of the remaining edges of the table for engagement with and raising of the end walls outer wall members, tongues carried by the end walls oscillatable plates for engagement with the end walls top wall members for disposing same and the end walls inner wall members and spacer at an angle to their outer wall members, power actuated means for oscillating said plates for disposing the side walls and end walls inner wall members normal to the box bottom panel and disposing the end walls top wall members, end walls inner wall members and end walls spacer flaps on the side walls and parallel with the bottom panel, and means for sequentially positioning the end walls spacer flaps normal to the end walls inner wall members and the end walls inner wall member normal to the end wall top wall members and disposing said end walls inner wall members parallel with the end walls outer wall members and the spacer flaps between the end walls and outer wall members, including a head, a slide depending from said head, yieldable means for holding said slide in position for engagement with and positioning of said end walls spacer flaps with respect to the end walls inner wall members, oscillatable plates operable after said slide has positioned the spacer flaps for engaging and actuating the end walls inner wall members to positions parallel with their end walls outer wall members, and means operable by said slide for retaining the spacer flaps in positions normal to their inner wall members during the positioning of said inner wall members.

15. In a box setting up machine for setting up a box that includes a bottom panel, integrally, hingedly, connected opposed side walls, integrally, hingedly, connected opposed end walls, said end walls, respectively, including an inner wall member, an outer wall member and a creeper flap at the end of the inner wall member, having, in combination, a supporting table of an area substantially equal to the area of and receiving the box bottom panel, retaining means on said table for engaging and retaining the box bottom panel on said table, an oscillatable plate mounted adjacent each of two opposed edges of the table for engagement with and raising of the box side walls, an oscillatable plate adjacent each of the remaining edges of the table for engagement with and raising of the end walls outer wall members, tongues carried by the end walls oscillatable plates for engagement with the end walls inner wall members for disposing same and the creeper flaps at an angle to their outer wall members, power actuated means for oscillating said plates for disposing the side walls and end walls outer wall members normal to the box bottom panel and disposing the end walls inner wall members and end walls creeper flaps on the side walls and parallel with the bottom panel, and means for positioning the end walls inner wall members parallel with their end walls outer wall members and the creeper flaps on the bottom panel, including a head, a plate spaced from said head, oscillatable means on said plate, one for each end wall inner wall member, for engaging its end wall inner wall member ahead of its creeper flap for forcing said inner wall member into the box and disposing the creeper flap at an angle to its inner wall member, and yieldable means for engaging and actuating said last named means for forcing the end walls inner wall members into parallelism with the outer wall members and the creeper flaps on the bottom panel.

16. In a box setting up machine for setting up a box that includes a bottom panel, integrally, hingedly, connected opposed side walls, integrally, hingedly, connected opposed end walls, said end walls, respectively, including an inner wall member, an outer wall member and a creeper flap at the end of the inner wall member, having in combination, a supporting table of an area substantially equal to the area of and receiving the box bottom panel, retaining means on said table for engaging and retaining the box bottom panel on said table, an oscillatable plate mounted adjacent each of two opposed edges of the table for engagement with and raising of the box side walls, an oscillatable plate adjacent each of the remaining edges of the table for engagement with and raising of the end walls outer wall members, tongues carried by the end walls oscillatable plates for engagement with the end walls inner wall members for disposing same and the creeper flaps at an angle to their outer wall members, power actuated means for oscillating said plates for disposing the side walls and end walls outer wall members normal to the box bottom panel and disposing the end walls inner wall members and end walls creeper flaps on the side walls and parallel with the bottom panel, and means for positioning the end walls inner wall members parallel with their end walls outer wall members and the creeper flaps on the bottom panel, including a head, a bracket spaced from said head, a plate oscillatably carried by each end of the bracket for engagement with an end wall inner wall member ahead of its creeper flap for forcing said inner wall members into the box and disposing the creeper flaps at an angle to their end walls inner wall members, said bracket plates being oscillated to a position for engaging the end walls inner wall members by yieldable means, and additional yieldable means operable for oscillating the bracket plates against the resistance of the first yieldable means and forcing the end walls inner wall members into parallelism with their outer wall members and the creeper flaps onto the bottom panel.

17. In a box setting up machine for setting up a box that includes a bottom panel, integrally, hingedly, connected opposed side walls, integrally, hingedly, connected opposed end walls, said end walls, respectively, including an inner wall member, an outer wall member and a creeper flap at the end of the inner wall member, having in combination, a supporting table of an area substantially equal to the area of and receiving the box bottom panel, retaining means on said table for engaging and retaining the box bottom panel on said table, an oscillatable plate mounted adjacent each of two opposed edges of the table for engagement with and raising of the box side wall, an oscillatable plate adjacent each of the remaining edges of the table for engagement with and raising of the end walls outer wall members, tongues carried by the end walls oscillatable plates for engagement with the end walls inner wall members for disposing same and the creeper flaps at an angle to their outer wall members, power actuated means for oscillating said plates for disposing the side walls and end walls outer wall members normal to the box bottom panel and disposing the end walls inner wall members and end walls creeper flaps on the side walls and parallel with the bottom panel, and means for positioning the end walls inner wall members parallel with their end walls outer wall members and the creeper flaps on the bottom panel, including a head, a bracket spaced from said head, a plate oscillatably carried by each end of the bracket for engagement with an end wall inner wall member ahead of its creeper flap for forcing said inner wall members into the box and disposing the creeper flaps at an angle to their end walls into wall members, said bracket plates being oscillated to a position for engaging the end walls inner wall members by yieldable means, additional means operable for oscillating the bracket plates against the resistance of the first yieldable means and forcing the end walls inner wall members into parallelism with their outer walls members and the creeper flaps onto the bottom panel, means actuating said head toward and from the supporting table, and means for removably securing the box to the head for movement therewith away from the supporting table after the final positioning of the end walls inner wall members.

References Cited in the file of this patent
UNITED STATES PATENTS

| 834,080 | Shearn | Oct. 23, 1906 |
| 2,458,341 | Cake | Jan. 4, 1949 |
| 2,518,014 | Inman | Aug. 8, 1950 |
| 2,655,843 | Baker et al. | Oct. 20, 1953 |